Oct. 23, 1956     H. V. KINDSETH     2,767,743
VERSATILE BAG-FILLING MACHINE
Filed Feb. 2, 1951     14 Sheets-Sheet 3

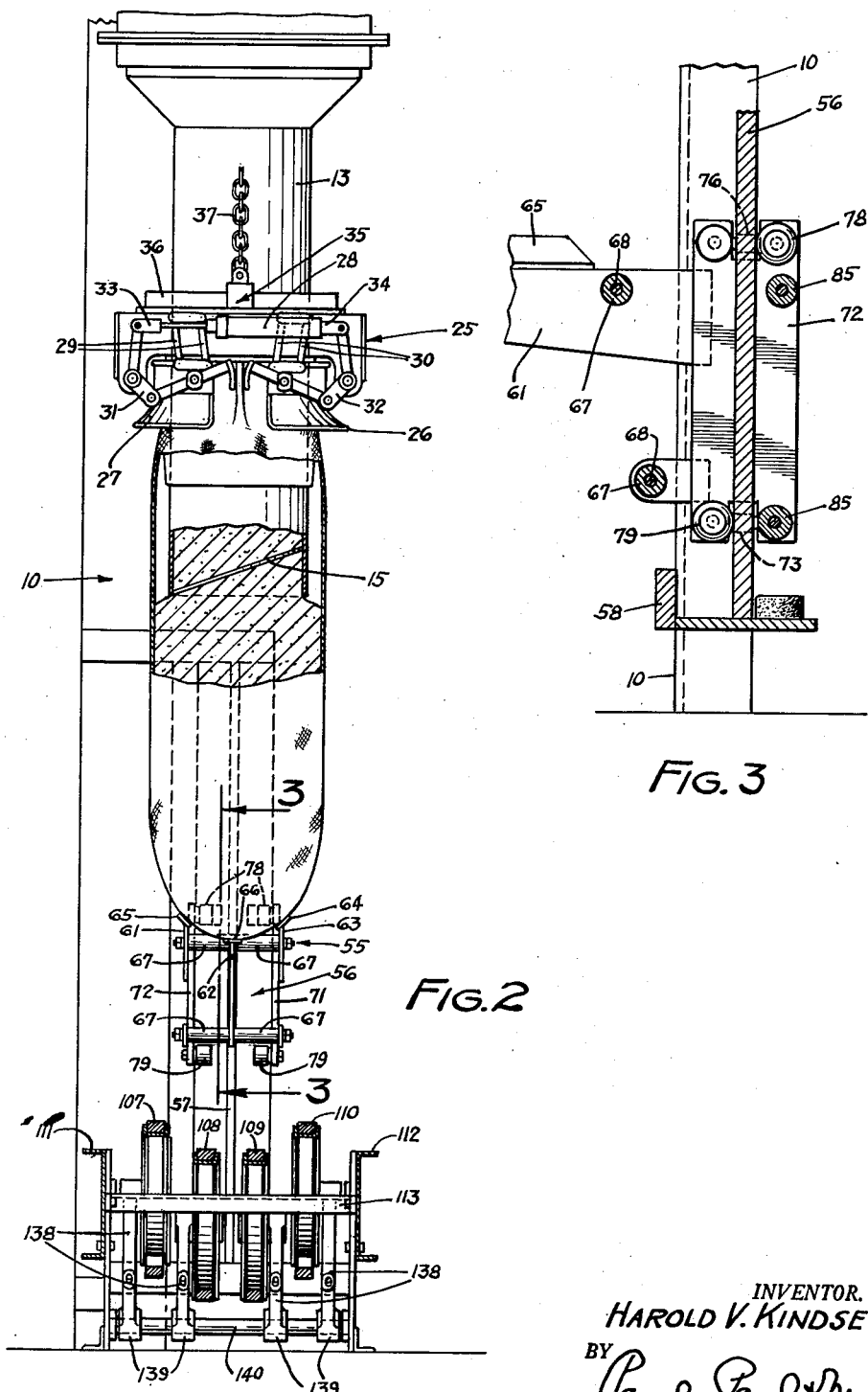

INVENTOR.
HAROLD V. KINDSETH
BY
Paul, Paul & Moore
ATTORNEYS

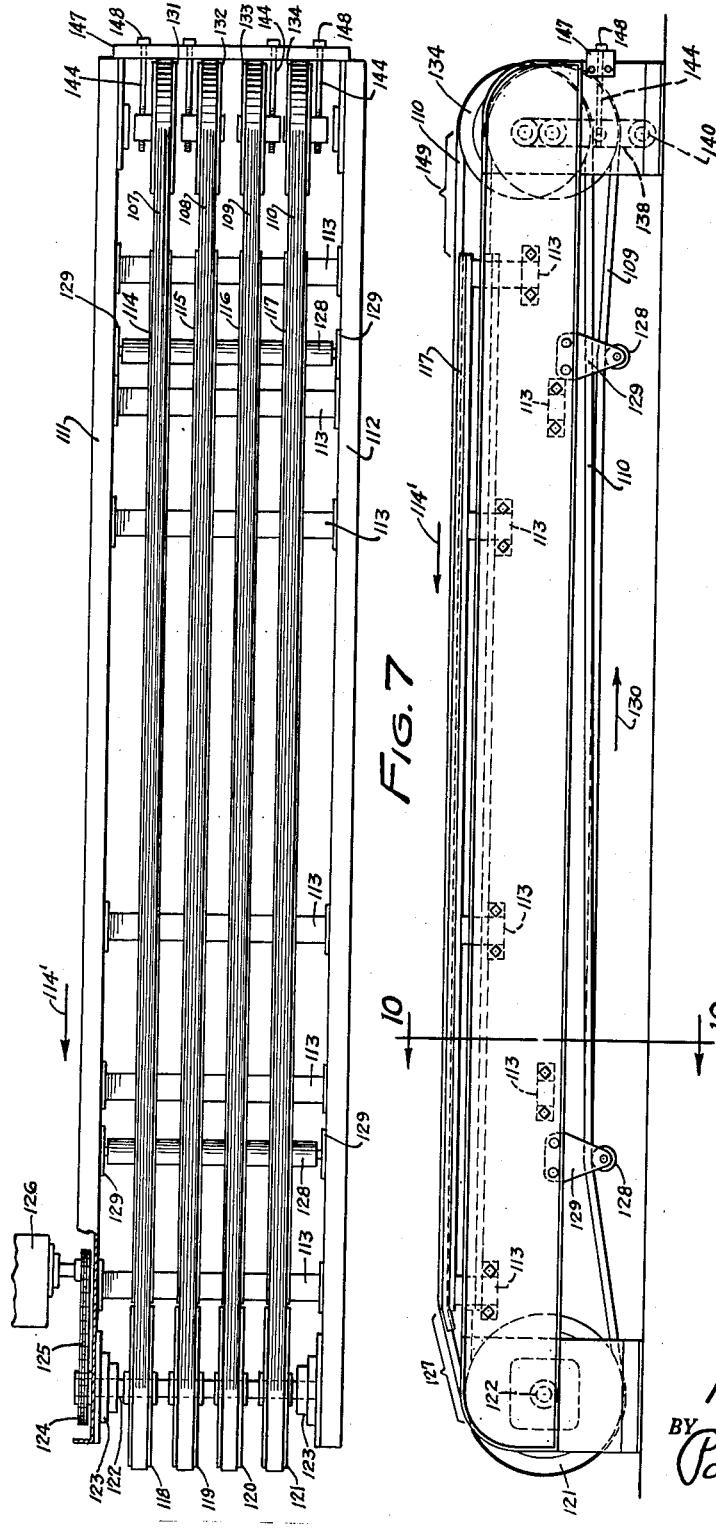

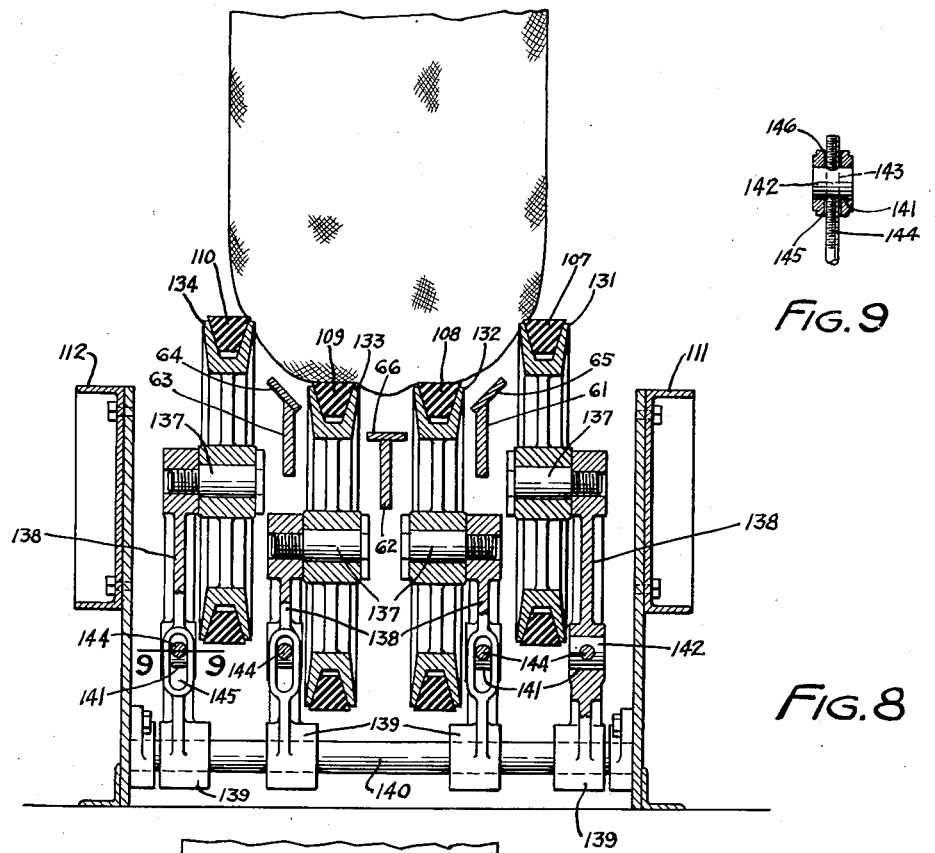
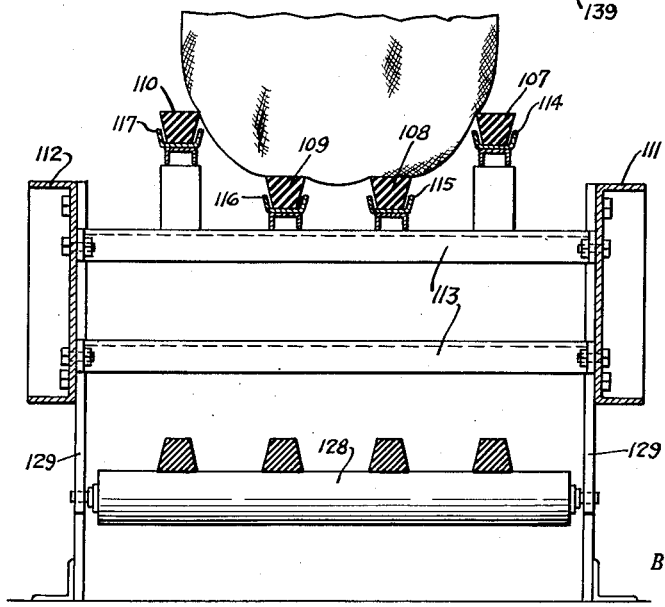

Oct. 23, 1956 — H. V. KINDSETH — 2,767,743
VERSATILE BAG-FILLING MACHINE
Filed Feb. 2, 1951 — 14 Sheets-Sheet 6

INVENTOR.
HAROLD V. KINDSETH
BY
ATTORNEYS

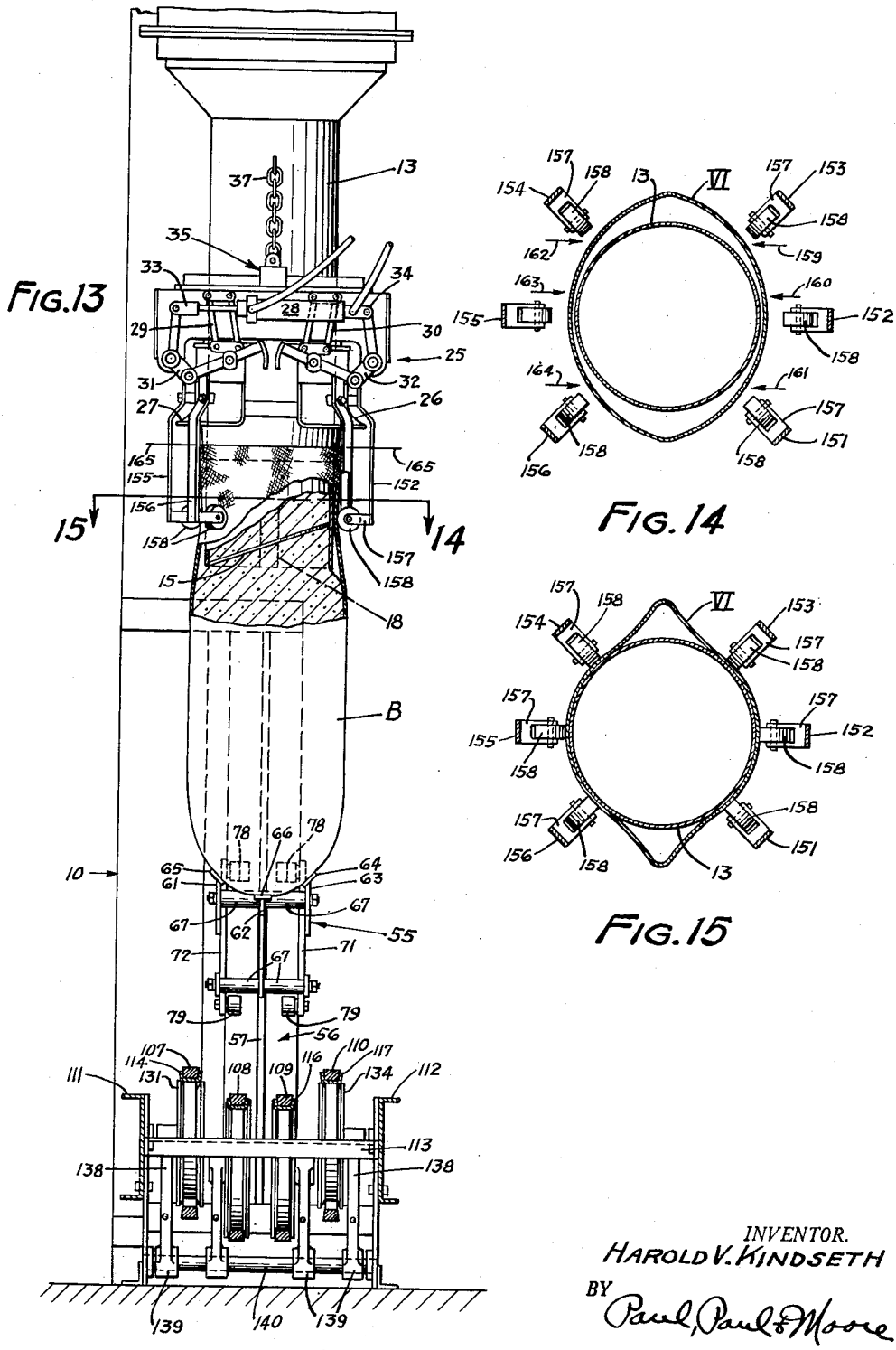

Oct. 23, 1956  H. V. KINDSETH  2,767,743
VERSATILE BAG-FILLING MACHINE
Filed Feb. 2, 1951  14 Sheets-Sheet 8

INVENTOR.
HAROLD V. KINDSETH
BY Paul, Paul & Moore
ATTORNEYS

Oct. 23, 1956  H. V. KINDSETH  2,767,743
VERSATILE BAG-FILLING MACHINE
Filed Feb. 2, 1951  14 Sheets-Sheet 9
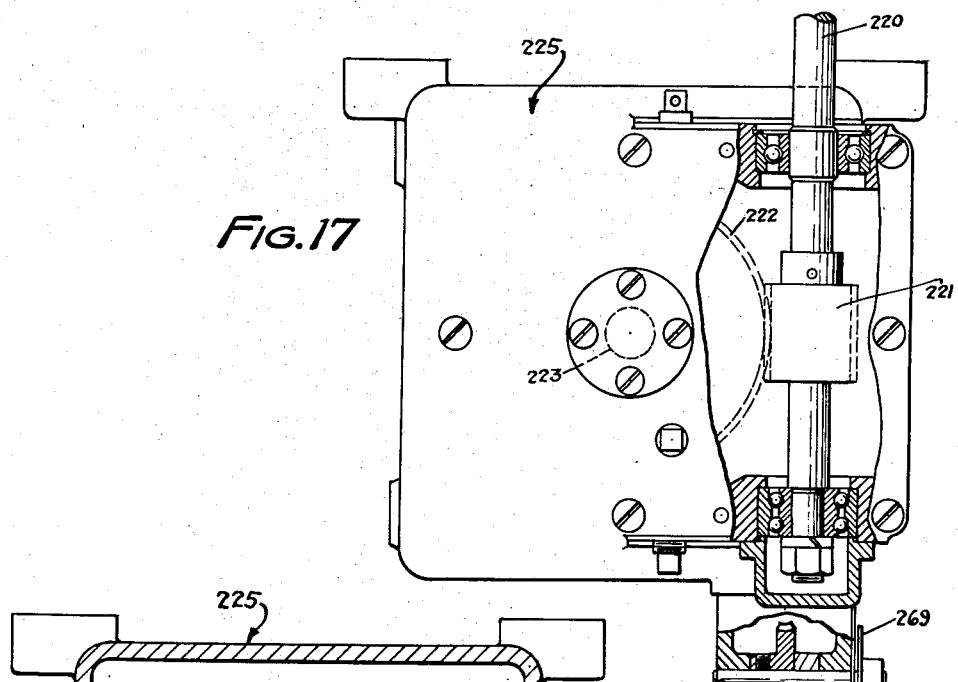
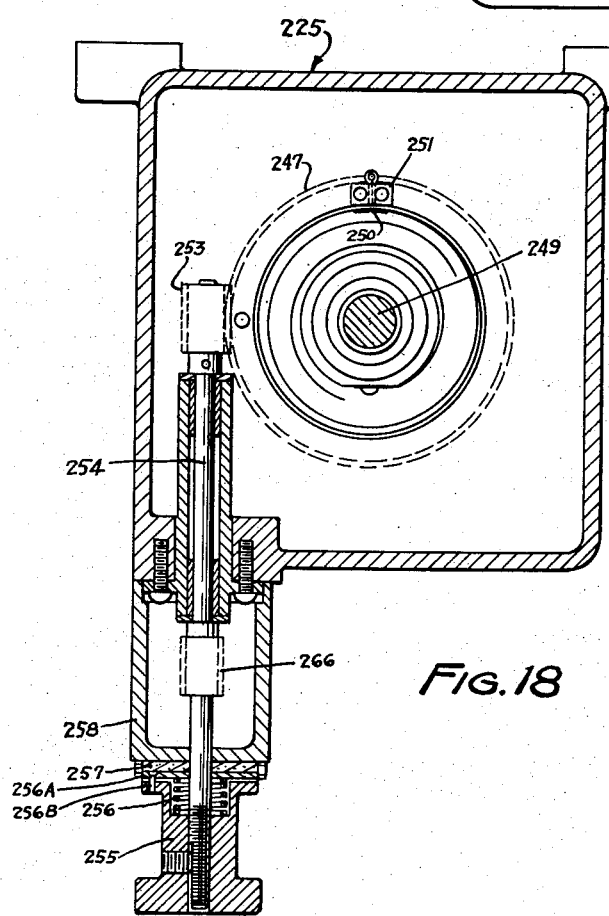
INVENTOR.
HAROLD V. KINDSETH
BY
Paul, Paul & Moore
ATTORNEYS Oct. 23, 1956  H. V. KINDSETH  2,767,743
VERSATILE BAG-FILLING MACHINE
Filed Feb. 2, 1951  14 Sheets-Sheet 10

INVENTOR.
HAROLD V. KINDSETH
BY
Paul, Paul & Moore
ATTORNEYS

Oct. 23, 1956  H. V. KINDSETH  2,767,743
VERSATILE BAG-FILLING MACHINE
Filed Feb. 2, 1951  14 Sheets-Sheet 12

INVENTOR.
HAROLD V. KINDSETH
BY Paul, Paul & Moore
ATTORNEYS

Oct. 23, 1956 H. V. KINDSETH 2,767,743
VERSATILE BAG-FILLING MACHINE
Filed Feb. 2, 1951 14 Sheets-Sheet 13

INVENTOR.
HAROLD V. KINDSETH
BY Paul, Paul & Moore
ATTORNEYS

Oct. 23, 1956    H. V. KINDSETH    2,767,743
VERSATILE BAG-FILLING MACHINE
Filed Feb. 2, 1951    14 Sheets-Sheet 14

INVENTOR.
HAROLD V. KINDSETH
BY
Paul, Paul & Moore
ATTORNEYS

United States Patent Office 2,767,743
Patented Oct. 23, 1956

2,767,743

VERSATILE BAG-FILLING MACHINE

Harold V. Kindseth, Minneapolis, Minn., assignor to Bemis Bro. Bag Company, Minneapolis, Minn., a corporation of Missouri Application February 2, 1951, Serial No. 209,070

22 Claims. (Cl. 141—195)

This invention relates to bag-filling machines and more particularly to a versatile bag-filling machine in which bulky materials of varying densities can rapidly be filled into bags of varying types and sizes. In the filling of materials into bags it is frequently a problem to be able to fill varying sizes and types of bags with the same or different materials and to introduce such materials into the bags quickly and compactly and at the same time introduce an exact quantity of material by weight into the bag, without underweight or overweight. To do this has usually necessitated several machines, thus adding to costs and space requirements.

It is a primary object of the invention to provide an improved versatile bag-filling machine capable of being set up expeditiously for the filling of varying sizes and types of bags and to provide for the rapid handling (filling) of fluffy, low and/or variable density materials into bags to exact weights in commercial operation.

It is an object of this invention to provide an improved bag-filling machine wherein the material to be bagged is introduced into the bag by means of an auger which is revolved, and the material is thereby moved through a filling spout for introduction into the bag.

It is another object of the invention to provide a bag filling machine in which the material is augered into the bag while the bag is held tightly or resiliently upon a spout containing the auger, and the material thereby introduced under pressure into the bag, the bag meanwhile being supported either by its open mouth or bottom or both.

It is another object of the invention to provide an automatic device which can be set into operation by an operator after the bag has been placed on the machine and which thereafter automatically introduces into the bag an amount of material which is less than but very close to the weight of material ultimately desired to be contained in the bag, and then the bag released from the machine and deposited upon a moving conveyor for carrying to a subsequent station where the necessary slight additional material is introduced so as to bring the bag up to a prescribed weight of contents prior to closure by sewing, stitching or otherwise.

It is a further object of the invention to provide an automatic machine wherein the bag is filled by an auger so as to produce a pressure of the material within the bag, while the bag is held tightly clamped to the bag-filling spout and then to release the bag and automatically lower it upon a conveyor for movement to a subsequent station.

It is an additional object of the invention to provide an automatic device wherein the bag is packed by means of an auger, the bag meanwhile being supported by a pneumatically operated mechanism and thereby the material packed in the bag against a pneumatic pressure, and the bag finally released and deposited electro-pneumatically for carrying to a subsequent station.

It is an additional object of the invention to provide an automatic bag-filling machine wherein the bag is clamped to a carriage movable downwardly upon a spout containing an auger which introduces the material through the spout and into the bag, the introduction of material being regulated and halted by virtue of the position of the bag support which may be a bag clamp supporting carriage movable on said spout, either alone or in cooperation with the movement of a bottom support for the bag.

It is a further object of the invention to provide in a bag-filling machine a bag clamp carriage movable downwardly on a bag-filling spout which has therein an auger for the introduction of material downwardly through the spout and to provide for discontinuance of introduction of such material through the spout in accordance with the number of revolutions of said auger which are turned during the filling operation, and to provide means for adjustment for varying the number of revolutions of said auger.

It is an additional object of the invention to provide a machine capable of being set up for filling automatically bags of varying sizes, such as bags having a capacity of as little as 25 pounds or up to bags having a capacity of 140 pounds or more of usual materials.

It is a further object of the invention in such machines to provide for continuous cycling of the machine by means of an automatic timer which maintains the machine in cyclic operation so that the operator has only to insert the bag upon the filling spout, preparatory to the closure of the bag clamp thereon in due time at the beginning of the bag-filling cycle.

It is a further object of the invention to provide a bag-filling machine in which the material to be bagged is augered into the bag and the discontinuance of such augering motion and consequent bag-filling is dependent upon the downward movement of the bag or the number of revolutions of the auger, selectively.

It is another object of the invention to provide a machine for filling bags automatically and such filling controlled in respect to extent of filling by virtue of the downward movement of the bag under the effect of the weight of filled material and filling pressure, or in response to the number of revolutions of a filling auger.

It is a further object of the invention to provide for optional bottom support of bags during filling and to provide for movement of said bottom support as a fork through the strands of a conveyor.

It is a further object of the invention to provide sub-assemblies, including a conveyor composed of parallel running spaced strands through which members are movable for depositing a filled bag on the conveyor for subsequent conveying movement thereon.

Other and further objects of the invention are those inherent in the apparatus herein illustrated, described and claimed.

The invention is illustrated with reference to the drawings in which corresponding numerals refer to the same parts, and in which Figure 1 is a front elevational view of the apparatus of the invention;

Figure 2 is an enlarged fragmentary sectional view taken along the line and in the direction of arrows 2—2 of Figure 1, showing the conveyor in section and the bag-filling spout with a large size bag thereon, the bag and spout being partly broken away;

Figure 3 is an enlarged fragmentary elevational view, partly in section, on the line 3—3 of Figure 2 showing a portion of the fork mechanism for supporting the bottom of the bag during the filling operation;

Figure 5 is shown partly in section, taken along the lines and in the direction of arrow 5—5 of Figure 4;

Figure 6 is a front elevational view of the conveyor mechanism;

Figure 7 is a plan view of the conveyor mechanism;

Figure 8 is an enlarged fragmentary sectional view of the conveyor mechanism with a bag thereon, taken along the line and in the direction of arrows 8—8 of Figure 5;

Figure 9 is a detail sectional view of a part of the conveyor belt adjusting mechanism taken along the line 9—9 of Figure 8;

Figure 10 is a further sectional view of the conveyor mechanism with a bag thereon taken along the line and in the direction of arrows 10—10 of Figure 6;

Figures 11, 12A, 12B, 12C, 12D:
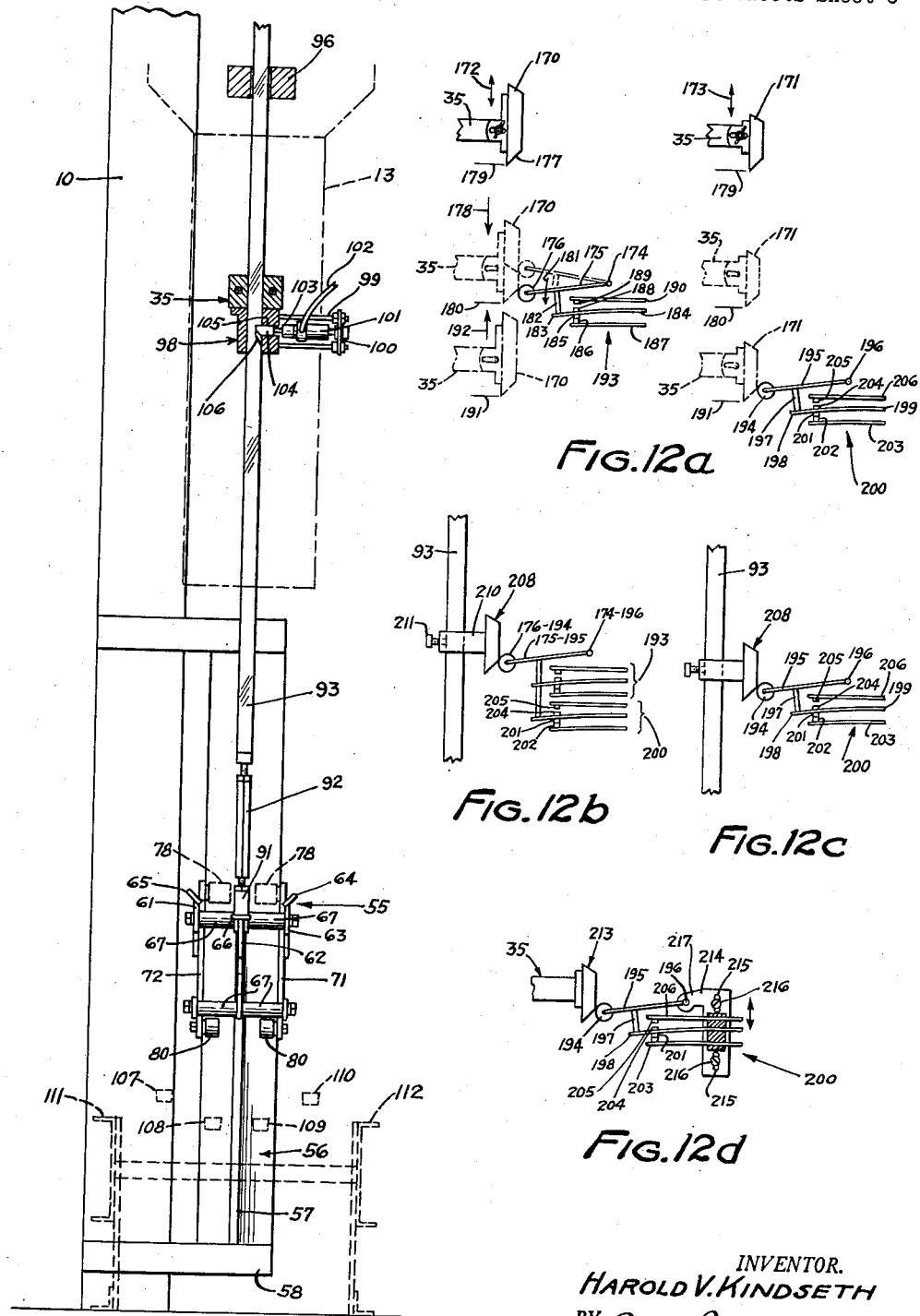
Figure 11 is a fragmentary vertical sectional view taken along the line and in the direction of arrows 11—11 of Figure 1 showing the bag bottom support fork mechanism interlocked with the bag clamp carriage mechanism movable upon the filling spout, as during one part of the machine cycle when the machine is set up for use of the fork support.
Figure 16:
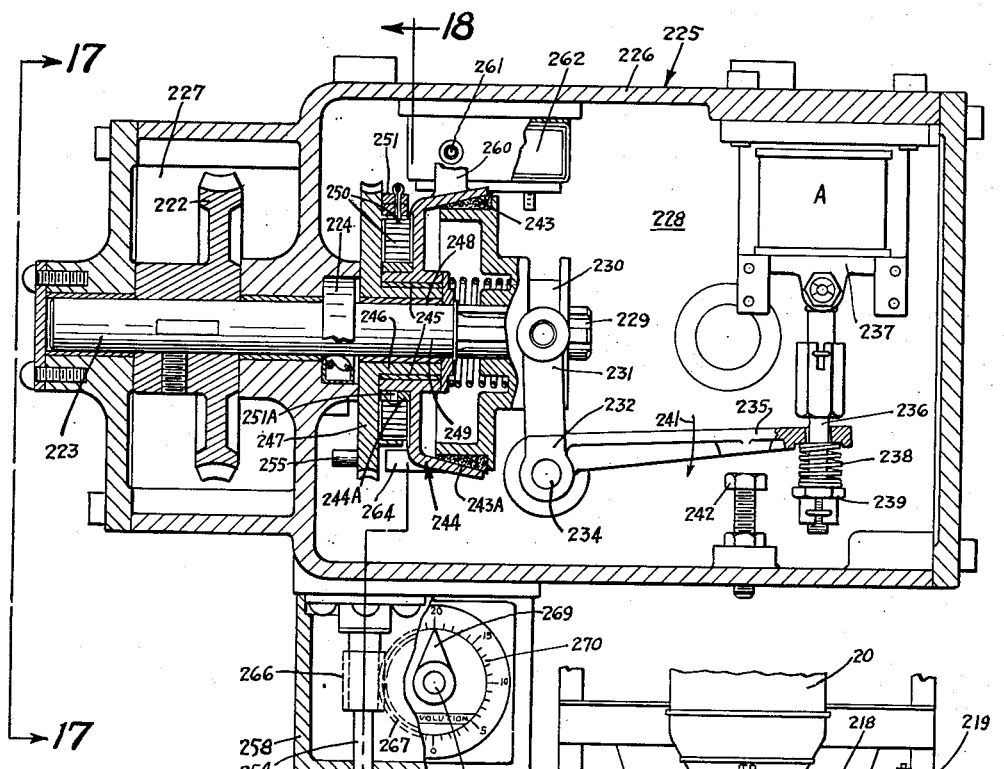
Figure 19:
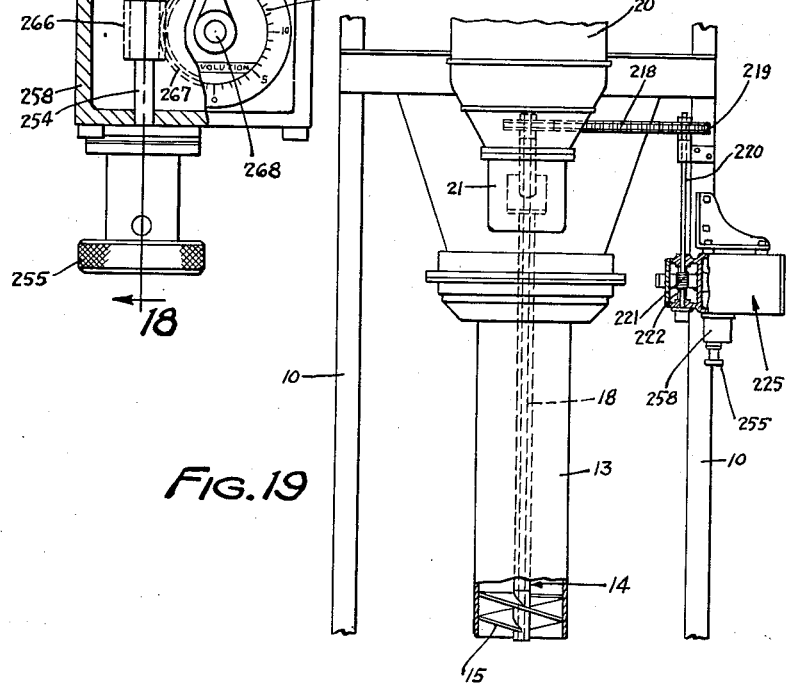
Figure 20:
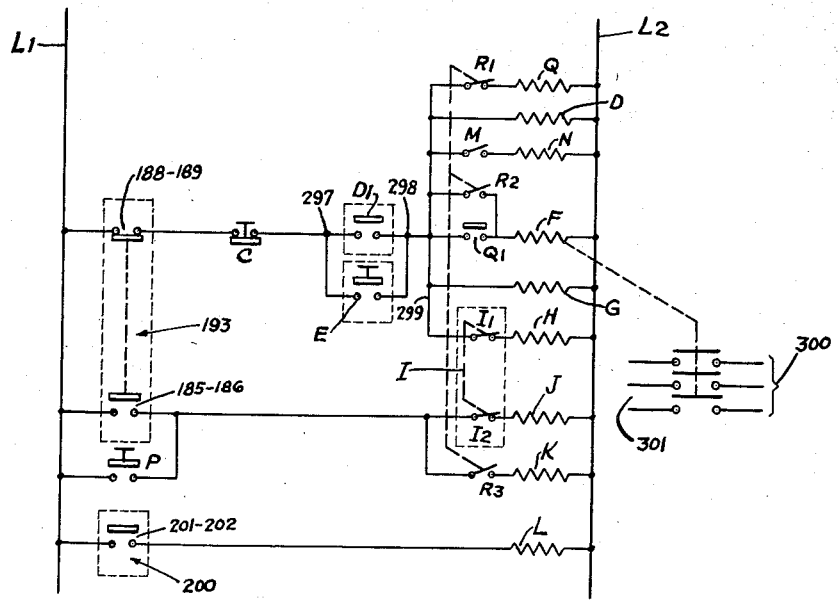
Figure 21:
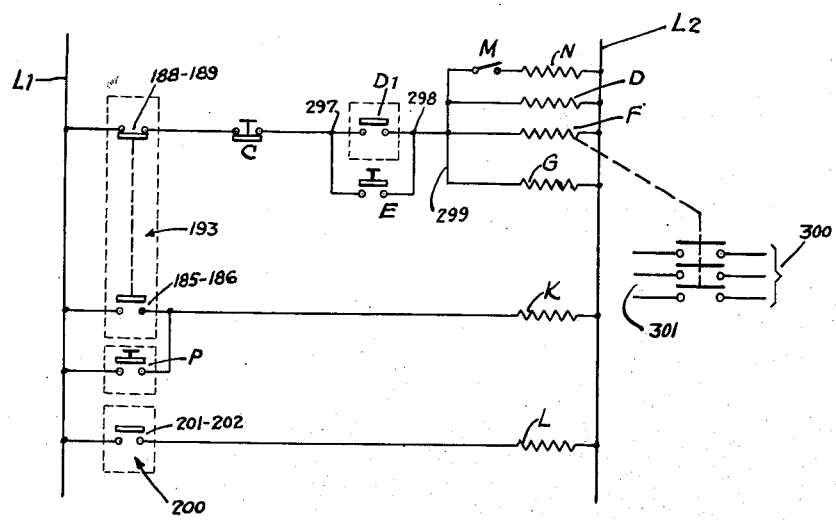
Figure 22:
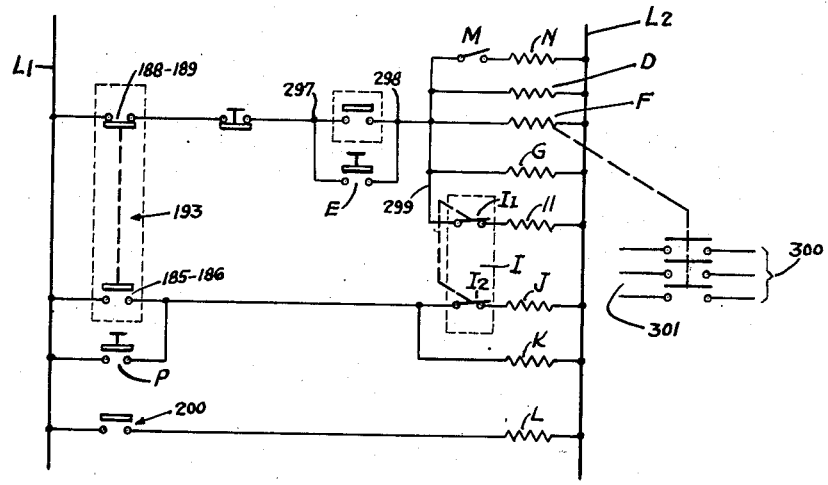
Figure 23:
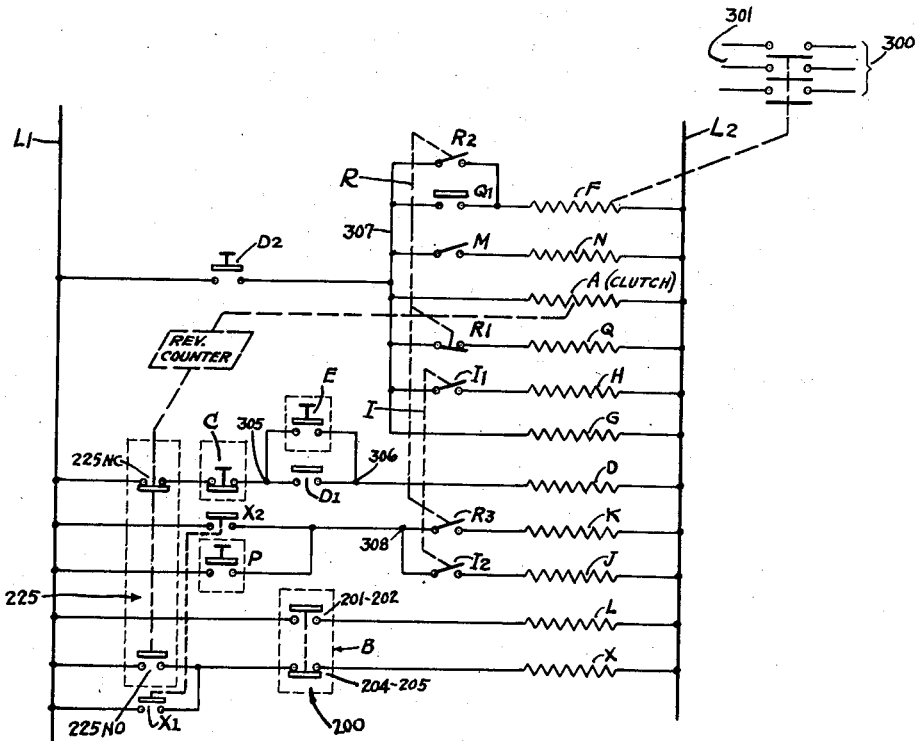
Figure 24:
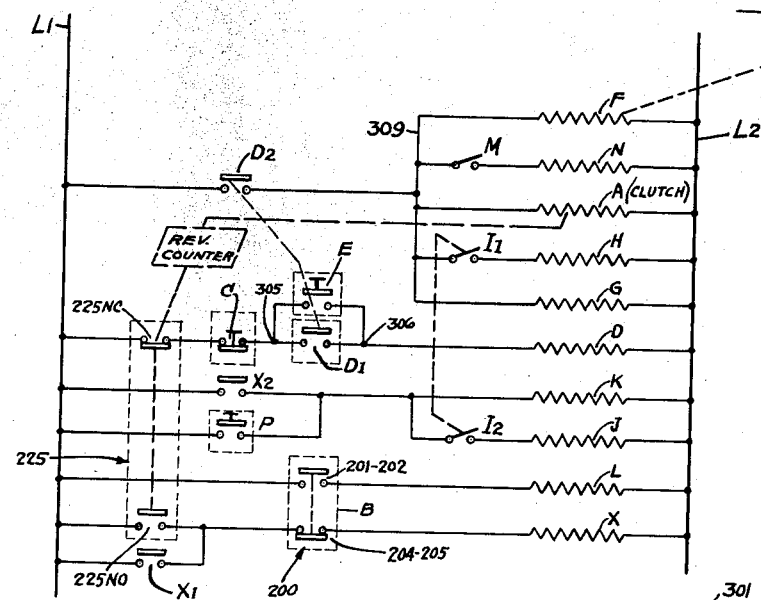
Figure 25:
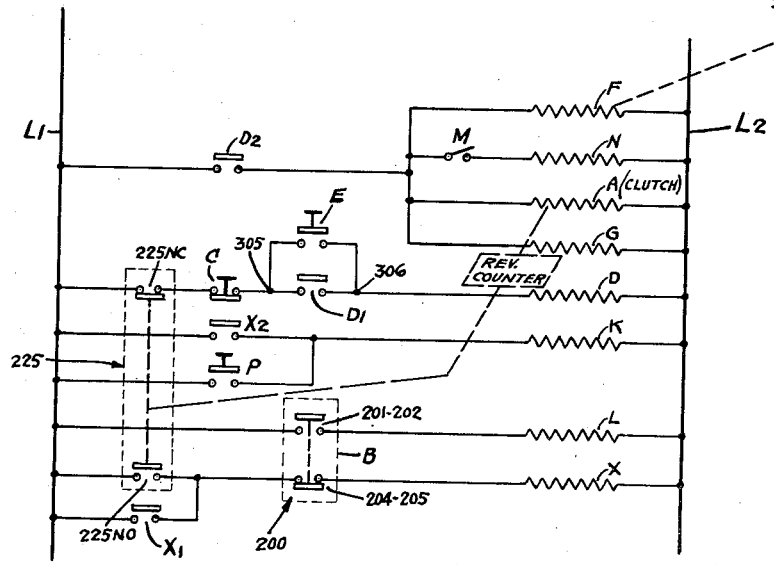
Figure 26:
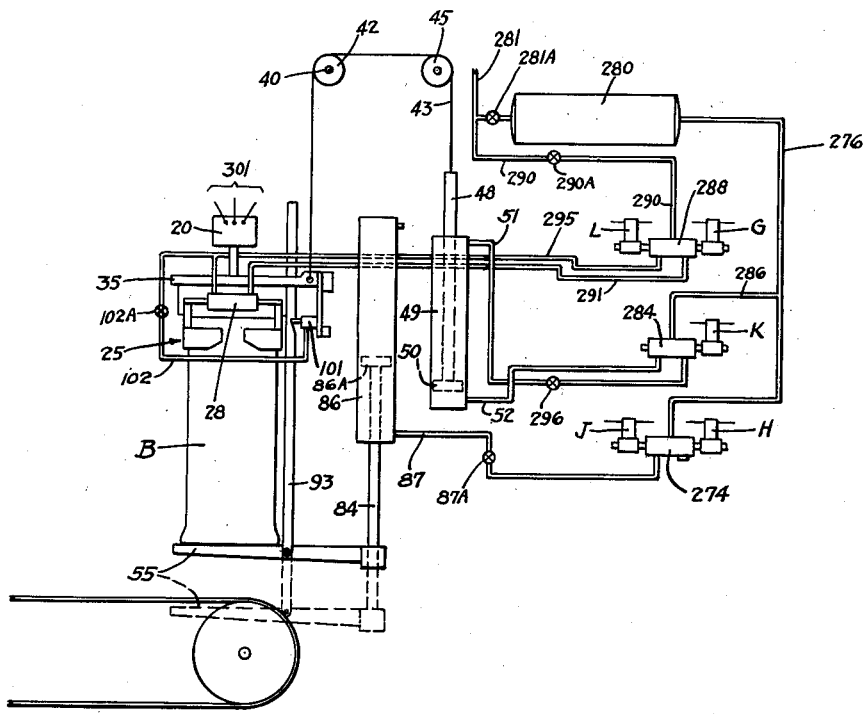
Figure 27:
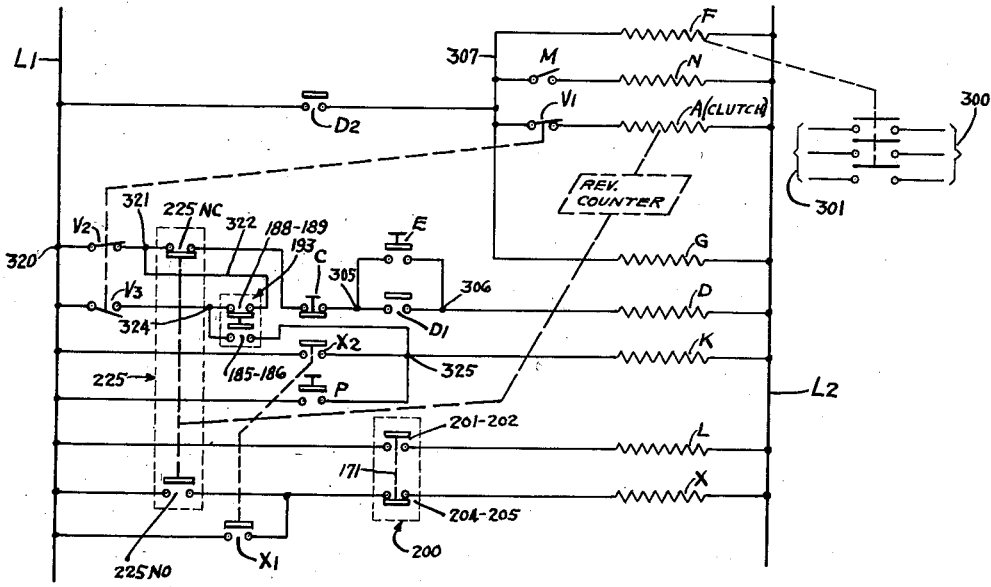
Figure 28:
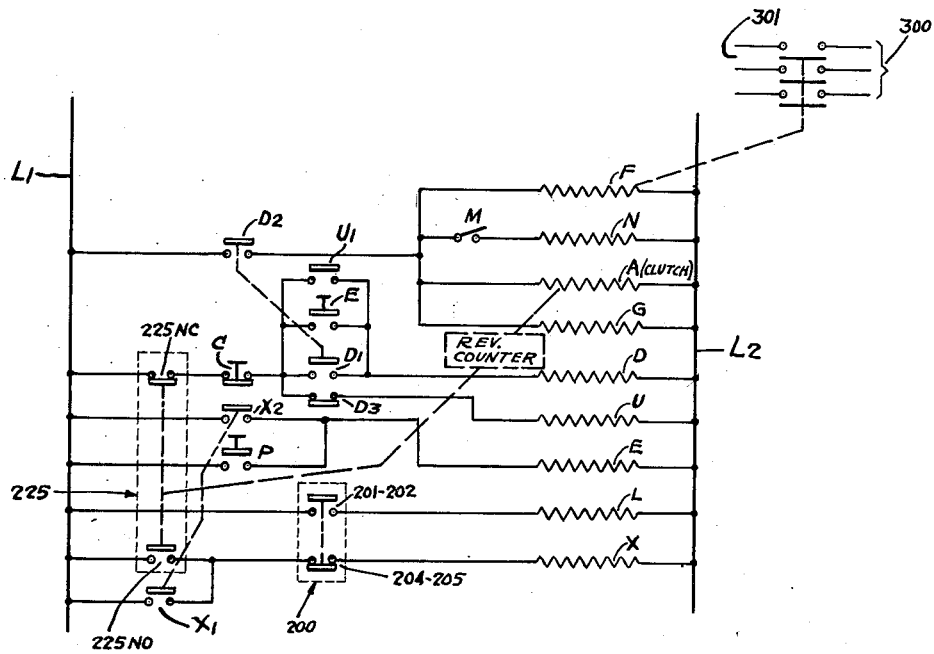

Figures 12a through 12d are a group of views illustrating schematically certain of the control switches of the machine when set up for different bag-filling operations, Figure 12a schematically illustrating the switches when the machine is set up for filling large size paper bags not requiring bottom support or large size textile bags when bottom support of the bag is necessary or desirable. Filling in both instances is controlled by the downward weight and/or filling pressure exerted through the filled bag onto the bag-carrying or supporting elements of the machine and the bag clamp carriage thereby caused to move; Figure 12b schematically illustrating the manner in which the control switches are actuated when the machine is set up for filling small size bags that are supported at the bottom during filling and where, again, the filling operation is controlled by the weight and/or pressure of the filled material exerted on the bag-supporting parts of the machine as the bag is filled; Figure 12c is a schematic view showing how the bag delivery switch is controlled when the filling of small size bags, which are supported at the bottom, is regulated by a revolution counter for the material auger; and Figure 12d shows schematically how the bag delivery switch is controlled when the machine is set up for filling large size bags, where the amount of material filled into the bags is regulated by a revolution counter for the material auger;

Figure 13 is a fragmentary vertical sectional view similar to Figure 2, except that the bag-clamping mechanism is adapted for the holding of smaller size bags, such as 50-pound bags;

Figures 14 and 15 are horizontal sectional views taken along the line and in the direction of arrows 14—15 of Figure 13, Figure 14 showing a resilient bag-clamping mechanism for small bags shown in the open position, whereas Figure 15 shows the same mechanism in the closed position;

Figures 16, 17, 18 and 19 relate to a revolution counting switch mechanism for controlling the operation of the auger, in which operation the switch is dependent upon the number of revolutions of the auger that are made during the filling operation. Figure 16 is a front vertical partial sectional view of the mechanism for counting the revolutions of the auger and for operating a control switch in response thereto; Figure 17 is a left vertical end view, partly in section, taken along the line and in the direction of arrows 17—17 of Figure 16; Figure 18 is a vertical sectional view taken along the line and in the direction of arrows 18—18 of Figure 16; Figure 19 is a fragmentary front elevational view of a part of the bag-filling mechanism showing the filling spout broken away and the auger therein, and illustrating the manner in which the revolution counter mechanism of Figures 16–18 is connected to the auger drive shaft for counting and thereby measuring the number of revolutions of the auger;

Figure 20 is a straight line diagram illustrating the manner in which the mechanisms of Figures 1–19 are connected for one type of service. In Figure 20 the apparatus is connected so that it may be used for the filling of either small or large and paper or textile bags, and in which the control mechanisms are responsive primarily to the position of the bag during filling. For the set-up of Figure 20, the control switches are operated as illustrated in Figure 12a for large size bags and as illustrated in Figure 12b for 50-pound bags. Cam 208, Figure 12b, is dropped out of the way when the carriage is used to operate switches, i. e. large size paper or textile bags;

Figure 21 is a straight line diagram showing the manner in which the apparatus is connected when it is used solely for the filling of large size paper bags, and in which the bag-filling and delivery controls are responsive to the weight of material in the bag and/or filling pressure exerted through the bag as indicated by the position of the bag clamp carriage as it moves downwardly, as the bag is filled, the control switches being set up as in Figure 12a;

Figure 22 is likewise a straight line diagram showing the manner in which the mechanisms are connected for the filling of large size paper or textile bags, and in which the filling and delivery operations are responsive to the weight of the bag and/or filling pressure as determined by the bottom and top bag supports, the control switches being set up as in Figure 12a;

Figures 23, 24 and 25 each are straight line diagrams showing the varying manners in which the apparatus of the invention may be set up for other types of service; Figure 23 shows the machine set up for versatile service, wherein either small or large bags of paper or textile material may be filled, and the filling controlled by the number of revolutions of the augering mechanism, and regulated by varying the switch settings thereof, the delivery switch being set up as in Figure 12c for 50-pound bags, and as in Figure 12d for large size paper or textile bags. Cam 208, Figure 12c, is dropped out of the way when carriage is used to operate delivery switch, i. e. large size paper or textile bags; Figure 24 shows the set-up of the apparatus for filling large paper or textile bags only, wherein the filling operation is mainly controlled by the number of revolutions of the augering mechanism; while Figure 25 shows the set-up for filling large paper bags only where, again, the filling operation is mainly controlled by the number of revolutions of the bag-filling augering mechanism. In the set-up of Figures 24 and 25 the bag is delivered in accordance with the operation of the bag delivery switch, as shown in Figure 12d;

Figure 26 is a schematic view of the interlocking air and electrical circuits and interlocking mechanical components of the mechanism;

Figure 27 is a straight line diagram showing the connection of the varying components wherein the filling operation is responsive selectively either to the position of the bag or to the number of revolutions turned by the augering mechanism. This straight line is representative of the type of connection to accomplish the purpose and shows specifically how the circuits of Figure 25 are revised;

Figure 28 is a further straight line diagram illustrating a modification of any of the foregoing circuit connections where it is desired to provide for continuous cycling of the machine on a time basis, the operator having only to insert the bag ready to be clamped, the clamping operation and ensuing cycling of the machine being automatically initiated by a timing mechanism.

Figure 1A:
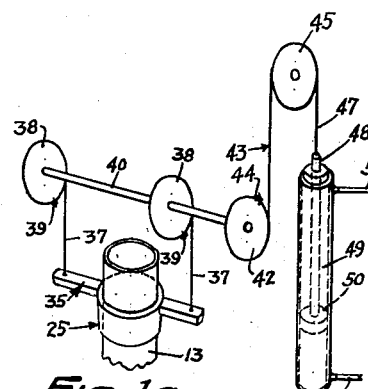
Figure 1A is a fragmentary isometric view of some of the rigging for counterbalancing the movement of the bag clamp carriage.
Figure 1:
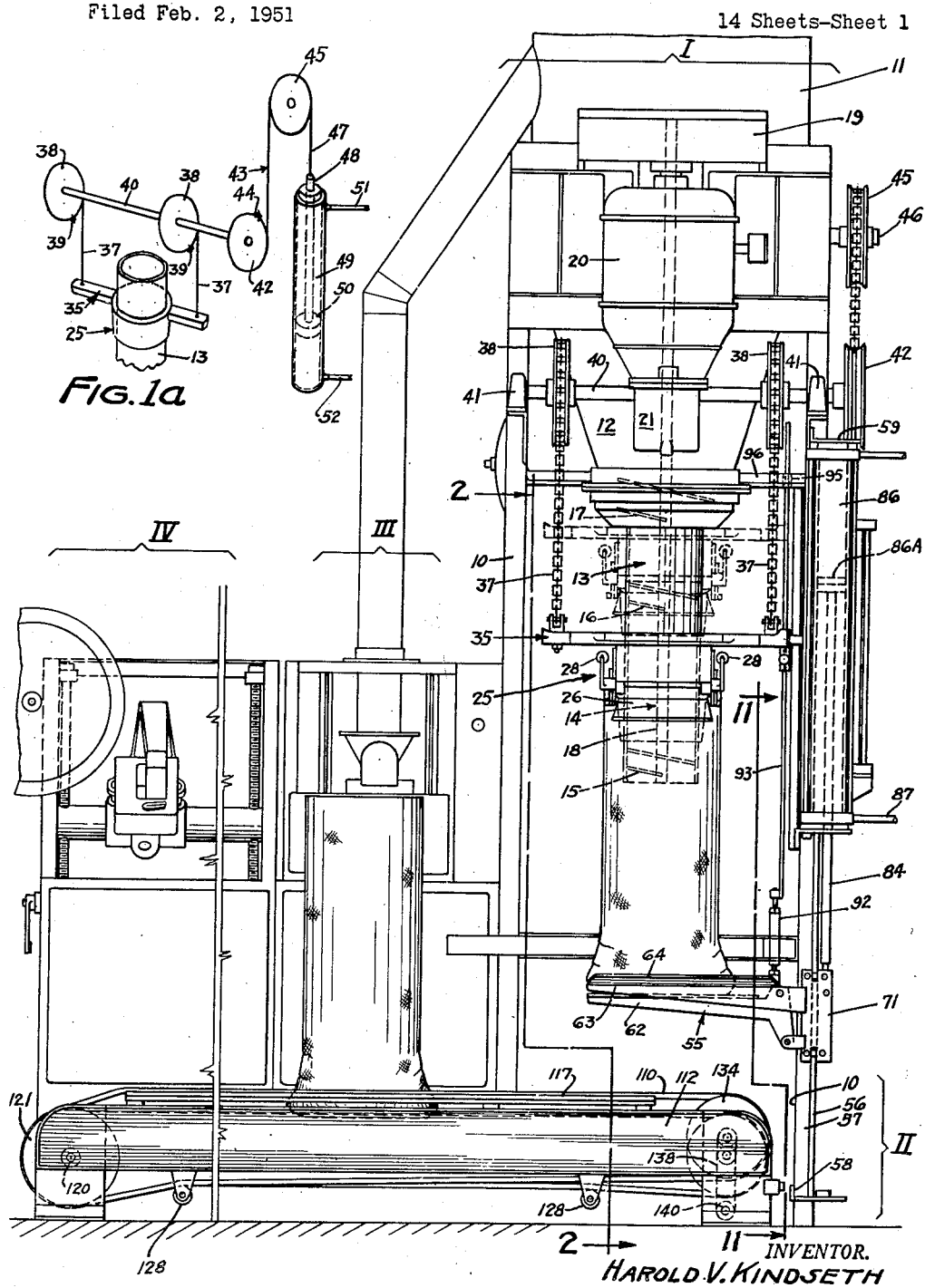

Referring to Figures 1 through 11 and Figure 26 particularly, the apparatus of the present invention forms a part of a bag-filling and closing system, of which a general front view is shown in Figure 1. In this bag-filling system there is provided an apparatus for filling the bag to an almost full condition, after which the bag is deposited upon a conveyor by a cooperating fork hoist and carried to another station where it is weighed and brought up to the exact weight of contents desired and then carried to a further station where it is closed. In Figure 1 the primary filling apparatus is shown generally under the bracket I. It is at this station that the bag is filled to almost its final weight. The bag is then deposited on a conveyor mechanism shown to the left of the bracket II which carries the almost filled bag to the final filling station which is shown under the bracket III. At station III the bag is elevated off the conveyor by a scale beam which has bag engaging parts extending up between the conveyor belts, and while the bag is thus elevated it is weighed and additional material dribbled into the bag, in accordance with the weight, until the net contents of the bag amounts to the desired weight. After being filled to exact weight, the scale platform (which works between the spaced conveyor belts to engage and lift the bag) is then again lowered until the bag returns onto the conveyor, and the bag is then moved past a closing station, shown under the bracket IV, at which the bag is closed, usually by a sewing mechanism which stitches the side walls of the bag together to effect top closure of the bag. The thus closed bag then is delivered off the end of the conveyor.

The weighing station shown under the bracket III and the bag closure station shown under the bracket IV, as well as the details of the conveyor II, per se, form no part of the present invention, these mechanisms being covered and claimed in others of my pending applications, namely Serial No. 183,229, filed September 5, 1950, and Serial No. 187,456, filed September 29, 1950, which are incorporated herein by reference. The subject matter of the cooperating bag supporting and lowering fork mechanism and multiple belt conveyor is a subcombination of this invention.

The primary filling station I is composed of a pair of upright frame members 10—10 which serve to support a bin 11 at an elevated position. The bin contains the material which is to be bagged and has a downwardly sloping bottom 12 through which the material to be bagged flows to a filling spout 13 which is of tubular cross section. Within the filling spout 13 there is provided an auger generally designated 14 which, at its lower portion, has a double threaded auger section 15. Above the bottom auger section there are one or more single worm sections at 16 and above the spout proper there is a larger diameter auger section at 17. The auger shaft 18 extends upwardly through the filling spout 12 and is connected through a mechanical gearing contained within the housing 19 to a drive motor 20 that is provided with a brake 21 that is electrically connected in parallel with the motor so that the motor is quickly stopped whenever the motor and brake are de-energized, and yet the motor is permitted to turn freely whenever the motor and brake are energized. The gearing 19 may be of either the chain gearing type or conventional gearing, and reduces the speed of the motor 20 sufficiently so that the auger shaft 18 and the auger sections mounted thereon rotate at a speed of approximately 450 R. P. M. when the motor 20 is operating. The auger speed can be varied widely in accordance with the types of materials being fed through the spout. In the design of the machine the speed of the auger may be selected by varying the type of gearing used so as to provide any desired auger speed, depending upon the types of materials being bagged.

Around the spout 13 there is mounted a bag clamp generally designated 25 which can be of a design such as shown in my copending application Serial No. 187,456, filed September 29, 1950. The clamp is provided with a pair of clamping jaws 26 and 27 (see Figure 2) that are mounted for movement toward and away from the spout 13 by means of a pair of air cylinders 28 that are connected by levers and links to the bag clamp 26 and 27, all as described in my copending application aforesaid. The bag clamp jaw 27 is supported by sets of parallel links 29 and the bag clamp 26 is supported by sets of parallel links 30 at each end. The clamp 27 is operated by a lever 31, whereas the clamp 26 is operated by the lever 32, the upper ends of the levers 31 and 32 being connected respectively to the piston rod 33 and (base of) cylinder 34. Piston 33 is double acting. Accordingly, when air is introduced under the piston contained within the cylinder 34, the rod 33 is pushed out, thereby causing movement of the bag clamps 26 and 27 to clamping condition, whereas when air is introduced above the piston in cylinder 34, the rod 33 is retracted and the clamps are opened. The bag clamp mechanism 25 accordingly closes when air is introduced under the piston in the cylinder 34 and opens when air is introduced over the piston, the opposite portion of the cylinder being meanwhile vented to atmosphere. A two-way solenoid operated valve controls air to the cylinders. The operation of the bag clamp is explained in detail in my application aforesaid.

The bag clamp 25 is mounted upon a carriage generally designated 35, which has a yoke portion 36 surrounding the spout 13. At opposite sides of the yoke carriage 35 extends outwardly from the bag spout 13, as shown in Figure 1, and to each of the outer ends there is attached the lower end of one of the chains 37—37. The two chains 37 extend upwardly from the ends of the carriage 35 and after wrapping nearly around, in each instance, one of the pulleys 38—38, the end of the chain is anchored to the pulley. The pulleys 38—38 are of sufficient diameter that slightly less than one turn of the pulley will receive enough of the chain 37 so as to permit the desired movement of the carriage 35 from its lowermost position of operation in the machine to its uppermost position shown in dotted lines in Figure 1. Accordingly, when the carriage 35 is in the dotted line position shown in Figure 1, each of the chains 37 wraps up around its pulley 38 and extend nearly around the pulley, the upper ends of the chain 37 being anchored to the pulley by the clamps 39—39. The pulleys 38 are mounted upon and keyed to a shaft 40 which is journalled in the bearing blocks 41—41 upon the frame members 10—10. Accordingly, the motion of the pulleys 38 in taking up or letting out the chains 37 imparts a rotary motion to the shaft 40. The shaft 40 extends to the right, as shown in Figures 1 and 1A, outwardly beyond the frame and at its outer end has another pulley 42 keyed thereon. The pulley 42 has a chain 43 attached to it at 44, as shown in Figure 1A. The chain 43 then wraps around the pulley 42 and extends up and passes over a sheave 45 which is rotatably mounted upon the stub shaft 46, the chain then extending down at 47 where it is attached to the upper end of a piston rod 48. The piston rod is received in the double acting cylinder 49, as shown in Figure 26. The piston rod 48 within the cylinder 49 carries the double acting piston 50 and the cylinder is provided with an air port 51 at its upper end and another air port 52 at its lower end. Accordingly, when air is introduced above the piston 50 a force is imparted to the piston rod 48 and then transferred through the chain 43 and over pulleys 45 and 42 to the shaft 40 and thence through pulleys 38—38 downwardly to the carriage 35. Accordingly, when air is introduced through pipe 51 into the cylinder 49 it causes the piston 50 and piston rod 48 to be pushed down. The carriage 35 is thereby elevated. As will subsequently be explained herein, the rotation of the auger mechanism 14 within the spout 13 causes the material to be packed solidly within a bag on the machine and this force is transmitted either through the carriage 35 (on which the bag may be suspended by bag clamp 25) or through a fork 55 which supports the bottom of the bag and is attached to carriage 35 through link 93, Figure 11, as will hereinafter be described, and the downward packing force is accordingly transferred through the carriage 35 and through the chain mechanism to the piston 50 within the cylinder 49. The control of the air pressures within the cylinder 49 is utilized for the purpose of controlling the packing pressure of the material within the bag.

Referring again to Figure 1, at the right side of the machine there is shown a fork mechanism generally designated 55 which serves to support the bottom of the bag B during certain filling operations, as for example in some large textile bags or small paper or textile bags. In other filling operations (for example, where large size paper bags are used) the fork mechanism 55 is lowered to its bottom position and is not utilized, the bag being entirely supported by suspension from carriage 35. However, for the filling of small size bags, paper or textile, or large size textile bags, which do not have the inherent strength of large size paper bags, the fork mechanism 55 is desirable and useful and is used to provide bag bottom support during filling and depositing the bag on the conveyor.

The mechanism 55 is best shown in Figures 1, 2, 3, 4 and 5. It consists of a vertical track generally designated 56 which has a stiffening web at 57 and is supported from the main frame 10 by means of the bracket structure 58 at its lower end and by means of the bracket 59 at its upper end. The track accordingly presents edge portions 56A and 56B (Figure 4) as vertical rails upon which the fork supporting mechanism 55 operates. The fork 55 is composed of three tines 61, 62 and 63 so shaped and spaced as to operate up and down between the conveyor belts. Each of the tines has a flange at its upper edge (Figure 8). Thus, the tine 63 has at its upper portion a flange 64 which is shaped generally to conform to the bottom of a filled bag. Likewise, the tine 61 has a flange 65 that is shaped so as generally to conform to the bottom of the bag. Similarly, the middle tine 62 has a flange 66 at its upper end which is generally flat and conforms generally to the bottom of a filled bag. The three tines 61, 62 and 63 are positioned relative to each other so that their upper flanges 64, 65 and 66 thus fit the bottom of the bag, as shown in Figure 8, when the tines are simultaneously raised.

The three tines 61, 62 and 63 are held in spaced relation by a plurality of long tubular collars 67, through which the bolts 68 pass completely through each of the tines. When the nut 69 on the ends of the bolts are pulled up tightly the three tines are held in assembled relationship.

Figure 4:
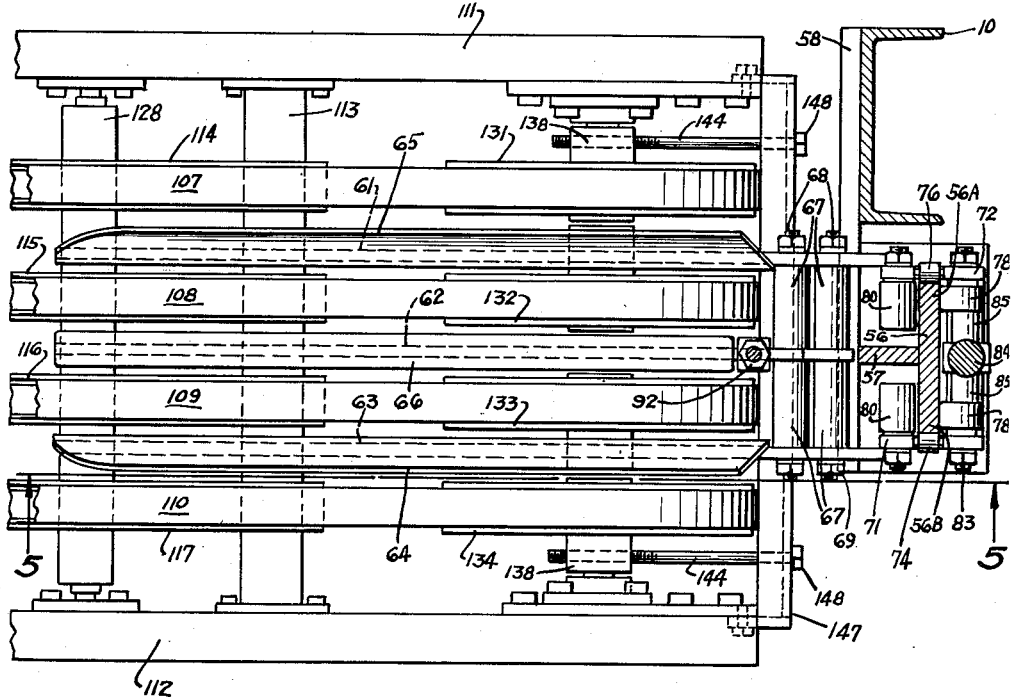
Figure 4 is an enlarged fragmentary right-end plan view of a portion of the conveyor mechanism at the bag-filling station and showing the bag-supporting fork mechanism in relation to the conveyor.
Figure 5:
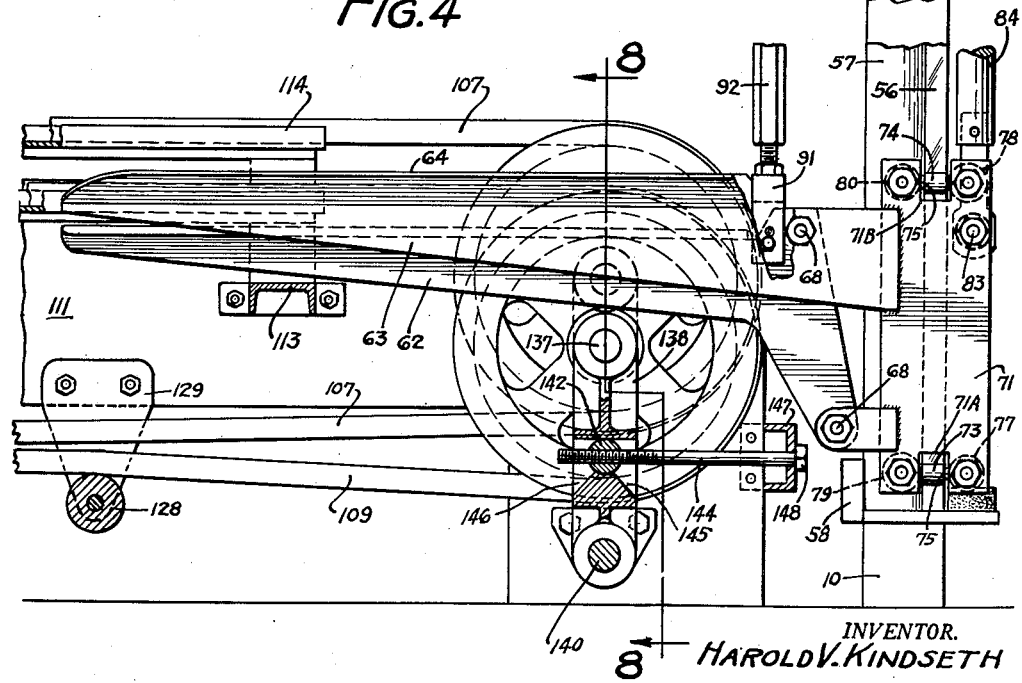
Figure 5 is an enlarged fragmentary front elevational view corresponding to Figure 4.

The outer tines 61 and 63 extend to the right, as shown in Figures 4 and 5 and have their right ends welded or otherwise suitably attached to a pair of plates 71—72, as shown in Figures 4 and 5. The plates 71 and 72 serve as mountings for rollers which engage track 56. Thus, plate 71 is provided with a lower notch 71A and an upper notch 71B to provide a space in which rollers may be mounted so as to engage the edges of flanges 56A and 56B of the vertical guide rail 56. Thus, in the notch 71A there is mounted a roller 73 which is pivoted upon the shaft 75 extending across the notch. Similarly, in the notch 71B there is mounted a roller 74 which is pivoted upon a similar shaft 75. Similar rollers are mounted on the plate 72. The upper roller 76 on plate 72 is shown in Figure 4. Each of the plates 71 and 72 in addition has four rollers which engage the front and the back faces of the flanges 56A and 56B of the rail. Thus, the plate 71 is provided with a pair of rollers 77 and 78 and another pair of rollers 79 and 80 which are spaced from each other so as to engage the front and back faces of the flanges 56A and 56B, respectively. The rollers 73 through 76 and 77—80 accordingly grip the faces and edges of the vertical rail 56 and permit the entire fork supporting mechanism generally designated 55 to move up and down freely upon the rail 56.

Extending across between the plates 71 and 72 is a through bolt at 83, Figures 4 and 5, which serve to attach the lower apertured end of a piston rod 84 to the plates 71—72 and hence to the fork supporting mechanism 55. A pair of spacing collars are supplied at 85—85 which serves to hold the lower end of the piston rod 84 centrally between the plates 71 and 72 when the nuts on the end of the bolt 83 are pulled up tightly. The piston rod 84 extends directly upwardly into a cylinder 86 shown in Figure 26. The cylinder 86 is solidly mounted upon the frame 10 and is provided with an air line connection 87 and an exhaust line 88. To the upper end of the piston rod 84 there is attached a piston 88. Accordingly, when air is introduced into the cylinder via line 87, the piston 88 is elevated, thereby likewise elevating the fork supporting mechanism 55. When line 87 is exhausted the weight of the fork mechanism 55 causes it to fall down, drawing piston 84 down also.

For certain types of operation it is desirable to connect the fork mechanism 55 and the carriage 35 which carries the clamp mechanism 25 to prevent excessive stretching of the bag, such connection being especially suitable for filling large textile bags, or for certain portions of the cycle of such filling operations. A mechanical connection for this purpose is shown in Figures 1, 4, 5 and 11. Thus, fork mechanism generally designated 55 has attached to the central tine 62 thereof the lower cleviced end 91 of a turnbuckle 92, the upper end of the turnbuckle being attached to a pull rod 93 of rectangular cross section which extends up through a correspondingly shaped slot 94 in the right arm of the carriage 35, as viewed in Figure 1. The rod 93 then extending upwardly, as shown in Figure 1, where it passes through a suitably shaped aperture 95 in the main frame member 96 which accordingly supports the upper end of the rod for up and down sliding motion. Upon the carriage 35 there is mounted a clamping member generally designated 98 which is solidly attached to the under side of the carriage 35. The clamping member is provided with a framework 99 extending forwardly, as shown in Figure 1, the outer end of the framework being provided with a plate 100 upon which the cylinder 101 of the clamping device is mounted. The cylinder 101 is provided with an air line 102 and within the cylinder there is slidably mounted the usual piston having a piston rod 103, the piston rod having attached to it a detent head 104 that is shaped so as to slide neatly back and forth within the aperture 105 of the clamping block 98. When the cylinder 101 has air introduced into it, the piston rod 103 is pushed in and accordingly the detent 104 is pushed away from the rod 93. As shown in Figure 11 the rod 93 is provided with a notch 106 that is shaped so as to receive the end of the detent 104, the detent being chamfered off at the bottom and the rod accordingly chamfered so that the rod 93 moves towards the carriage 35, the detent 104 will first snap into the notch 106 and then ride out of the notch as the motion of the rod 93 continues in the upward direction. However, as the rod 93 moves away from the carriage 35 (downwardly, Figure 11), it finally reaches a place where the detent 104 snaps into the notch 106 and then the flat upper side of the detent 104 is retained and should the rod 93 move further downwardly, the carriage 35 is also pulled down. Thus, if a large textile bag is clamped to the carriage but at the same time supported by fork 55, most of the weight and/or packing force exerted through the material onto the bag is transferred through the bag bottom to fork 55 and thence through linkage 93—98 to carriage 35 which is caused to move down, more due to the pull of rod 93 than the pull of the bag through clamp 25. This action spares the bag.

The air cylinder 101 may be designed so that the piston rod 103 is pushed in either direction by means of the spring. In the form illustrated a spring, not illustrated, within the cylinder 101 is arranged so as to maintain the piston rod 103 and the detent head 104 in the position shown in Figure 11 (away from rod 93). When air is introduced into the cylinder, the piston is moved in a direction so as to retract the detent head 104 away from the rod 93 and when air is exhausted the detent head moves to the locking position.

Referring to Figures 1, 2, 6 through 10 particularly, the conveyor mechanism shown opposite the bracket II of Figure 1 is composed of a plurality of V-belts 107, 108, 109 and 110 which are mounted within a framework composed of the side plates 111 and 112 that are held in spaced relationship by the cross frame members 113. The upper portion of the belts, as shown in Figures 6 and 7, move to the left as shown by the arrow 114′, Figure 6, and the position of each belt during this upper part of the course of travel, is determined by a V-shaped trough along which the under side of the belt travels. Thus, the belt 107 is supported for a straight course of travel by means of the trough 114, the belt 108 is supported by the trough 115, the belt 109 by the trough 116 and the belt 110 by the trough 117. As shown in Figure 2 these troughs 114 through 117 are positioned so that troughs 114 and 117, which determine the travel of the outer belts, are at an elevated position, whereas belts 115 and 116 are at a somewhat lowered position. Considered together, therefore, the four belts generally provide a spatial arrangement which fits the bottom contour of a filled bag and therefore supports it from front, middle and back tipping movement during its travel, see Figure 8.

The V-belts are driven by a plurality of pulleys 118 through 121 which are mounted upon and keyed to a shaft 122 that is supported in the journals 123 in the frame members 111—112, Figures 6 and 7. The shaft extends through the frame 111 and is provided with a sprocket at 124 which is rotated by the chain belt 125 from the gearmotor 126. Accordingly, when the motor 126 is energized, all of the pulleys 118—121 rotate and the belts 107—110 are moved in the direction of arrows 114′, Figures 6 and 7. The portion of the movement of the belt from the left ends of the troughs 114—117 to the pulleys 118—121, as shown in Figures 6 and 7, is free travel, this portion being shown under the bracket 127 of Figure 6. If desired, the left end of the troughs 114—117, as shown in Figures 6 and 7, may be bent down slightly so as to reduce the abruptness of the change in direction of the belts as they leave the troughs.

The back travel of each of the belts is determined either by the position of the idler roller at the right end of the conveyor frame, as shown in Figures 6 and 7, or by idler pulleys. Two idler rollers 128—128 are journalled for rotation on the brackets 129—129, as shown in Figure 6, and the belts on the back travel move in the direction of arrow 130. At the right end of the conveyor mechanism there are provided a V-belt idler pulley for each of the V-belts. Thus, the belt 107 runs over the pulley 131, the belt 108 over the pulley 132, the belt 109 over the pulley 133 and the belt 110 over the idler pulley 134.

The idler pulleys are similarly mounted, and hence the mounting of only one need be explained in detail. Referring particularly to Figures 6 through 9, the pulley 134 rotates on a stub shaft 137 which is screwed into the upper end of a radius arm 138, the lower end of the arm 138 being journalled at 139 upon the cross shaft 140. Between the upper and lower ends of the arm 138 there is cross bore 141, as shown in Figure 9, in which a short piece of shafting 142 is inserted, the shafting being threaded at 143 to receive the threaded end of a pull rod 144, which serves to preserve suitable tension on the belt. The arm 138 is provided with a somewhat conical shaped eye at its front and back sides, these eyes being illustrated at 145 and 146 through which the forward and back ends of the rod 144 extend. The rod 144 extends outwardly beyond the cross frame member 147 and has a wrench head at 148 by means of which the rod may be turned. Thus, by screwing inwardly on the rod, the arm 138 is drawn towards the end of the conveyor, and accordingly the pulley 131 is likewise moved in that direction, and therefore tightens the belt 107. The pulleys 132—133—134 are mounted in precisely the same manner, except that the supporting arms for pulleys 132—133 are shorter and hence support these pulleys at a lower elevation than pulleys 131—134. The elevations of each of the pulleys is so adjusted that the belts will run directly off the pulleys and onto the supporting troughs as shown for the course of travel of the belt 110 under the bracket 149 in Figure 6. Similarly, the belts 109 and 108 run directly off the upper part of their somewhat lower mounted pulleys 132 and 133 and directly onto the trough 115—116.

Referring to Figure 2 and also to Figures 13, 14 and 15 there is illustrated in these figures the bag clamp mechanism for holding the large size bags, as shown in Figure 2, and the small size bags, as shown in Figures 13–15. The bag clamping arrangement of Figure 2 has already been described, and that shown in Figures 13–15 is of exactly the same fundamental type as shown in Figure 2, except that from the flare on each of the clamping sections 26 and 27 there are downwardly extending spring fingers, each of which has a roller at its lower end. Thus, from the bag clamping portion 26 there are three downwardly extending fingers 151, 152 and 153 and from the cooperating bag clamping section 27 there are three additional downwardly extending spring clamping fingers 154, 155 and 156. Each of these fingers is identical in construction and at its upper end is solidly attached to the bag clamping section upon which it is mounted. The lower ends of the spring clamping fingers 151—156 have brackets 157 upon them and the brackets serve pivotally to mount the rollers 158. Accordingly, when the bag clamping section 126 moves toward the spout 13, the three spring fingers 151—153 likewise move toward the spout in the direction of arrows 159—161, and as the bag clamping section 27 is simultaneously moved toward the spout 13 the spring fingers 154—156 and the rollers mounted thereon likewise move towards the spout in the direction of the arrows 162—164, thus bringing the rollers into contact with the bag which surrounds the spout so as to move it from the position shown in Figure 14 to the position shown in Figure 15. The form of clamping arrangement shown in Figures 13 through 15 is for smaller size bags which do not reach up far enough so as to be gripped by the clamping sections 26 and 27. Accordingly, the upper end of such smaller size bag is shown at the level 165—165 of Figure 13, and while the bag is held with reasonable security against the spout 13 as it is filled, the bag must be supported at its bottom by means of the fork supporting mechanism generally designated 55. When the fork supporting mechanism 55 is lowered, such a smaller size filled bag likewise moved downwardly and its upper portion pulls out from the resilient holding force exerted by the rollers on clamping fingers 151—156. This form of operation will subsequently be described.

In general it may be said that the sequence operation of the machine is initiated by the operator (or by a timer mechanism) and once set in motion the filling operation is carried out and the bag deposited on the conveyor automatically. This operation is controlled by the movement of the bag clamp carriage 35 which serves to operate certain controlling switches, or the movement of the fork support 55 which supports the bottom of the bag, which likewise operates control switches, depending upon the particular type of bag and filling operation, and in some instances is also controlled by a counting mechanism and switch responsive to the number of revolutions of the auger.

The control switches operated by the bag clamp carriage 35 and the bag bottom supporting fork 55 are shown set up for various operations in Figures 12a, 12b, 12c and 12d, to which reference is now made. These figures illustrate the mounting of various of the control switches for different types of operation.

In Figure 12a the movable carriage 35, upon which the bag clamps are mounted, has adjustably attached to it by wing nuts a cam 170 and at another place has adjustably attached to it a cam 171. Both of these cams are mounted so as to be adjustable up and down in the direction of the arrows 172 and 173 with reference to the carriage 35, the cam 170 being longer in the vertical direction than the cam 171. Adjacent the cam 170 there is mounted a switch 193 operated by this cam. Switch 193 is shown schematically and includes a pivot at 174 upon which the arm 175 pivots arcuately. At the outer end of the arm 175 there is rotatably mounted a roller 176 that is positioned so that it will be engaged by the sloping downward edge 177 of the cam 170 when the cam 170 moves downwardly in the direction of arrow 178 from level 179 to level 180. When this occurs the roller 176 is moved arcuately downward in the direction of arrow 181. An insulating pin 182 on the arm 175 is arranged so as mechanically to contact the outer end 183 of the resilient contact spring 184, thereby causing its contact 185 to move into engagement with a contact 186 on the spring 187, thereby establishing that circuit. Simultaneously, the contact 188 of the spring 184 is moved away from contact 189 on the spring 190 thereby breaking that circuit. As the cam 170 moves down to the level 191 the arm 175 is maintained in the position shown until the cam moves off roller 176, whereupon switch 193 resumes normal position with 188—189 closed and 185—186 open. When the cam 170 moves in the upward direction as indicated by arrow 192, arm 175 swings clear and contacts 188—189 are allowed to come together under their own action established through them and contacts 185—186 are moved apart, thereby breaking the circuit between them.

By adjusting the position of the cam 170 relative to the carriage 35 (or by adjusting the setting of switch 193 relative cam 170) the time in the stroke at which the switch 193 is operated can be varied.

Cam 171 is adjusted to operate switch 200 after switch 193 is operated but before cam 170 moves off roller 176. Cam 171 should operate switch 200 between levels 180 and 191. The sloping lower edge of the cam 171 engages the roller 194 which is pivotally mounted at the outer end of swinging arm 195, the arm in turn being pivotally mounted at 196. When thus engaged, as shown in Figure 12a, the insulating pin 197 engages the outer end 198 of a central spring contact finger 199, causing its contact 201 to be brought into engagement with the contact 202 of the lower spring contact finger 203 and simultaneously causing the contact 204 to be moved out of engagement with the contact 205 on the contact spring 206. When the carriage 35 begins its upward travel, the cam 171 moves out of engagement with the roller 194 thereby permitting contacts 204 and 205 to close and contacts 201 and 202 to open, which are the normal positions.

In general it may be stated that the switch 193 is for the purpose of stopping the rotation of the auger mechanism so as to stop the filling operation. Another purpose of switch 193 is to cut off air pressure to the packing cylinder and/or fork supporting cylinder that the bag may continue in a downward motion after augering pressure is stopped. Switch 193 is therefore designated the auger stop switch. Switch 200 has for its primary purpose the operation of the bag clamping mechanisms, and when contacts 201 and 202 are closed against each other, as described, pneumatic air control mechanisms are operated so as to cause the bag clamp to be unclamped, thereby permitting the bag to be delivered downwardly onto the conveyor. Accordingly, the switch 200 is designated the bag delivery switch. In certain types of operation the position of the cam 171 may be adjusted (or the level of the switch 200 changed) so that the switch 200 is operated simultaneously with the operation of the switch 193 when the carriage 35 reaches the level 180. The arrangement of switches shown in Figure 12a is utilized when it is desired to fill large size bags, either paper bags or textile bags, without the use of the auger revolution counter. Thus, where the mechanism is, for example, used to fill 100-pound bags of flour, feed, etc. the operation can be carried out by utilizing the control switches 193 and 200, as shown in Figure 12a. The difference between the levels 180 and 191 is a relatively small proportion of the entire vertical stroke of the bag clamp carriage 35 and may be adjusted to suit the particular filling operation involved. The arrangement of switches shown in Figure 12a is most particularly adapted for the circuit arrangements hereinafter described with reference to Figures 21 and 22. The switch 200 illustrated in Figure 12a has a normally closed pair of contacts 204—205 and a normally open pair of contacts 201—202. In some modes of operation, as hereinafter described, only one pair of contacts are used.

In all types of operation in which amount of augered material is controlled by position of auger stop switch relative to carriage only the normally open contacts of switch 200 are required to open bag clamps.

In all types of operation in which amount of augered material is controlled by the revolution counter switch, the normally closed contacts of switch 200 are required in addition to the normally open to form part of a holding circuit. The holding circuit is necessary because the revolution counter switch is momentarily acting switch.

Referring to Figure 12b there is illustrated the arrangement for operating the auger control switch 193 and the bag delivery switch 200 when the machine is arranged for the filling of relatively small size bags, such as 50-pound bags, where the auger revolution counter switch 225 is not used in the operation. Thus, for such an operation a cam generally designated 208 is provided, the cam being supported by an arm 210 that is adjustably held by means of the screw 211 upon the connecting rod 93 attached to the bag bottom support fork 55. By loosening the screw 211 the position of cam 208 vertically along the rod 93 can be varied. In Figure 12b there is schematically illustrated only one of the rollers 176—194 for the operation of both of the switches 193—200, but it may be understood that the cam 208 may have a sufficiently wide face so that rollers 176 and 194 of the switches 193 and 200, respectively, can operate side by side on the cam. As shown in Figure 12b when the fork mechanism 55 descends, the cam 208 is brought into engagement with the roller mechanism 176 or 194 or both and the switches 193 and 200 are moved to their operated conditions, as shown in Figure 12. This arrangement of switches and operation is used most particularly with the circuit diagram shown in Figure 20. In Figure 12b the switches 193 and 200 are, of course, set up in a position (different from Figure 12a) so as to be engaged by cam 208.

Where it is desired to fill relatively small bags, such as 50-pound bags and to control the filling operation by means of a revolution counter switch 225 (hereinafter described in detail) the bag delivery switch 200 only is used, the auger stop control switch 193 being replaced in the operation by an auger revolution counting switch 225, hereinafter to be described. Thus, in Figure 12c the cam support 208 may be identical with that shown in Figure 12b, but in this case it operates only the switch 200. The switching arrangement shown in Figure 12c is most particularly used with the wiring diagram, Figure 23.

Referring to Figure 12d there is illustrated the switching mechanism that is used for the filling of large size bags, either paper or textile, when the filling operation is principally controlled by means of a revolution counter switch, which will be described more in detail hereinafter. For this service the carriage 35 is provided with a cam mechanism 213 which is arranged to operate the bag delivery switch 200. In this form of mounting the bag delivery switch 200 is mounted upon a plate 214 which is provided with slots at 215 so that it can be adjusted in the vertical directions and held in position by screws 216. The pivot 196 for the swinging arm 195 that operates the switch is likewise mounted upon side arm 217 of the plate 214 so as to be carried therewith. Accordingly, when the carriage 35 moves downwardly the lower sloping end of the cam 213 is brought into engagement with the roller 194, thereby causing the switch 200 to move to the operated condition shown in Figure 12d. The mounting of switch 200 and the operator therefor, as shown in Figure 12d, is most particularly used with the circuit diagrams of Figures 24 and 25.

Switches 193 and 200 have bases like that shown for switch 200 in Figure 12d, to allow easy adjustment and remounting from place to place (Figures 12a to 12d). It is understood that the operator mounts the switches (193 and 200) and their appropriate operating cams for the various set ups depending upon the types of bags being run. Frequently, only a few minutes time is needed for setting up the machine for filling a different type or size of bag.

The apparatus for counting (or measuring) the number of revolutions or fractions thereof of the auger mechanism 14 is best illustrated in Figures 16 through 19. This revolution counting switch 225 which is shown assembled with the remaining apparatus in Figure 19, has for its essential purpose the opening of a control circuit after the auger mechanism 14 has turned through a prescribed number of revolutions needed to force a specified amount of material into the bag suspended on or supported below the spout 13. For this purpose the auger shaft 14 is provided with a chain 218 which runs over sprocket 219 on the shaft 220 that extends down and through the worm 221 operates and turns the mating worm gear 222 of the auger switch mechanism generally designated 225. After a predetermined number of revolutions of the auger 14, a microswitch 262 having a normally closed pair of contacts and a normally open pair of contacts is operated within the mechanism 225 and this switch upon operating permits mechanism 225 to reset to a zero position, and also at the same time causes the bag-filling operation to be controlled, to stop the auger and deliver the bag. The switch 225 serves an analogous purpose to the auger stop switch 193, although in some operations both switches may be used selectively or together.

Referring to Figures 16 through 18 the auger revolution counter has a housing 226 having a gear box portion 227 at one end in which the gears 222 and the mating worm gear 221 (Figure 17) are contained, the gears being driven by the auger, as shown in Figure 19. The shaft 223 (Figure 16) upon which the gear 222 is keyed extends through the bearing and grease shield 224 into the switch mechanism space 228. The outer splined end 229 of the shaft 223 carries the clutch hub 230 which has a circular groove in it that is engaged by the forked end 231 of the clutch control bell crank lever 232 pivoted upon the stub shaft 234. The clutch control bell crank lever 232 has an outwardly extending end 235 apertured at its outer end to receive the solenoid link 236 attached to the solenoid armature 237. A spring 238 between the lever 235 and the end nut 239 serves to take up the movement of the solenoid armature and spares hammering on the clutch. When the solenoid coil A is de-energized, the operating lever 235 is permitted to move downwardly due to its own weight in the direction of arrow 241 until it hits the adjustable stud 242, but when the coil A is energized the lever 235 is moved to the position shown thereby causing the clutch mechanism to be engaged.

The clutch mechanism includes a conical clutch facing 243 which is received into and engages upon the inner conical surface 243A of a driven clutch member generally designated 244 having a bushing 245 that is journalled upon a bearing collar 246 that is integral with the worm gear 247. The worm gear 247 is in turn journalled at 248 upon a smooth section 249 of the shaft 223. The worm gear 247 serves as an anchor for one end of the coil spring 250, and by turning (adjusting) the worm gear 247, the anchor position of spring 250 can thus be changed. The worm gear 247 is revolved (for adjustment) by means of a mating gear 253 on the shaft 254 (Figure 18) that is turned by the hand nut 255. The gear 247 might be turned all the way around except that a stop stud 255 (Figure 16) on the gear 247 hits against a portion (not shown) of the casing, thus preventing the worm 247 from being turned through more than one complete turn (which might cause the coil spring 250 to be broken). Accordingly, the worm gear 247 can be turned approximately one revolution in either direction by turning the thumb nut 255. The thumb nut 255 has a spring 256 attached to it as to force the washer 256A (that is keyed by pin 256B to the thumb nut 255) into engagement with a friction collar 257 that in turn seats against end 258 of the housing 225, thereby frictionally holding the nut 255 from too easy turning, but it can be turned for adjustment.

The spring 250 has one of its ends attached to a stud 251 on gear 247 and the other of its ends pinned at 251A to the central hub 244A of clutch 244. The clutch 244 has a protuberance 264 on it which engages against the spring anchor 251 on gear 247 when the clutch 244 is turned far enough. Spring 250 is wound up a little before being anchored at 251 and 251A and hence when clutch 243—243A is disengaged, the unwinding tension of the spring 250 turns the clutch collar 244 around until stop 264 hits against stop 251, the position of the latter being capable of adjustment via worm gear 247 and hand nut 255. This stopped position of clutch 244 is the beginning position (which may be adjusted) from which clutch 244 turns in its auger revolution counting function, and spring 250 is wound tighter in so doing.

The clutch 244 has a second outward protuberance 260 positioned so as to engage the operating stem 261 of a microswitch 262, switch 262 being fully enclosed. When the clutch cone 243 is released from the clutch surface 243A, the entire cone mechanism 244 rotates under the (unwinding) influence of the spring 250 until stop 264, which is a part of the clutch cone 244, revolves into contact with the stop 251 on gear 247. Then when the solenoid A is again energized, the clutch 243—243A is again energized and the clutch member 244 slowly rotates from such position in which it has been stopped until the protuberance 260 engages the switch operating stem 261 and operates the switch 262. The switch 262 is provided with one set of normally closed contacts 225NC and one set of normally open contacts 225NO, which are opened and closed respectively when the switch is operated by the push imparted by member 260 on the operating stem 261 of said microswitch. The operation of switch 262 (contacts 225NC and 225NO) causes the motor 20 to be de-energized, all as hereinafter described, and also cause the solenoid coil A to be de-energized, thereby disengaging clutch 243—243A. When this occurs, spring 250, which has been wound up, causes clutch 244 to move backwards until stop 264 engages stop 251, ready for another timing operation.

The fractional portion of one revolution turned by clutch 244 from its starting position until 260 operates stem 261 therefore "counts" the turns of auger 14 required for such operation of switch 225, and this "count" can be preset by the operator by adjusting nut 255. Hence, if the bags are filled a little too full, the count is reduced and vice versa.

Within the housing portion 258, Figures 16 and 18, there is provided a small worm gear 266 which engages with the gear 267, the latter being mounted upon the shaft 268 that is provided with a pointer 269 operating over the scale 270. The operator is thus provided an indicia indicating the number of revolutions of the auger for which the switch 225 is set. The auger revolution counter has the essential purpose of stopping the filling of the bag. The operator sets the switch 225 by noting the setting on the scale 270 and fills a bag. The switch 225 is then readjusted one way or the other so as to bring the weight of the bag very close to but slightly less than the final weight, so as to reduce the amount of additional material that is dribbled into the bag at station III of Figure 1. By means of the auger revolution counter switch 225 the bags may be very accurately filled almost to final weight and hence only a little material need be dribbled into the bag at station III, thus speeding the filling operation.

Referring to Figure 26, as previously explained, the cylinder 86 is provided with an exhaust port 88 which is above the piston and an intake line 87 through which air is introduced into the cylinder below the piston to cause the piston to rise and elevate the form mechanism 55 to support the bottom of the bag. Air is supplied to line 87 by means of the pneumatic control valve 274 having two valve positions which are determined by the energization of the solenoids J and H. Thus, when the solenoid H is energized the valve 274 is moved so as to introduce air from the tank supply line 276 through the valve 274 to the line 87, thereby causing the piston within cylinder 86 to be elevated, thereby to elevate the bag-supporting fork 55. When the solenoid J is energized the valve 274 is moved to the opposite position, thereby permitting the air in line 87 and the portion of cylinder 86 to which it is connected, to be exhausted through the valve 274 to atmosphere.

It will be noted that line 276 is connected to the air supply tank 280 on the machine, the air supply being furnished by the air main 281 through adjustable air presure regulator 281A from any suitable compressed air source.

The control of air to the cylinder 49 is by way of the connections 51 and 52, which are connected to the valve generally designated 284. The valve 284 is spring returned and has two operating positions controlled by the energization or de-energization of the solenoid K. When the solenoid coil K is de-energized, the valve 284 connects the tank line 286, which is full of compressed air from tank 280, through the valve 284 and thence through adjustable needle valve 296 via line 51 to the upper part of the cylinder 49, thereby causing pressure to be exerted downwardly upon the piston 50 within the cylinder 49. This accordingly exerts a force upwardly upon the carriage 35 as previously explained and the material that is forced into the bag is packed against this upwardly exerted pneumatically controlled force, thereby to cause packing of the material within the bag. As the material is packed into the bag the carriage 35 is forced downwardly, thereby causing the piston 50 in the cylinder 49 to be moved upwardly within the cylinder, accordingly forcing the air which is under pressure above the piston in cylinder 49 outward through the pipe 51 and through the valves 284 and through the lines 286 and 276 to the tank 280, thereby forcing air back into the tank. Since the tank pressure can be varied via valve 281A, it follows that the force exerted through piston 50 in cylinder 49 and through the connected linkages to bag clamp carriage 35 (and optionally the fork lift 55) to the bag B, may likewise be varied. In this way the tightness of packing can be adjusted by changing the setting of valve 281. Tank 280 has sufficient capacity in respect to cylinder 49, so that the pressure in it is not appreciably elevated when the air over piston 50 in cylinder 49 is forced back to the tank. Therefore, the packing pressure remains to all intents constant as the bag is filled.

The line 52 is open to atmosphere through the valve 284 as the bag is filled. When the solenoid K is energized, the valve 284 shuts off the line 286, thereby closing off the movement of compressed air from the cylinder 49 to tank 280 and allowing it to pass through valve 284 to atmosphere. Line 52 is connected to tank pressure. A needle valve in line 52 may be adjusted to give the proper surge from tank 280 for delivery. The compressed air within the cylinder and within line 51 is then exhausted to atmosphere through line 51 and valve 284. The upward thrust upon the piston 50 caused by tank pressure through valve 284 and line 52 serves to cause the carriage 35 to be given a downward component of movement or "kick" that is utilized for quick downward delivery of the bag B.

The control of the bag clamp mechanism 25 is by means of the solenoid operated valve mechanism 288 which has two solenoid coils for moving said valve to its two operating positions. The valve 288 is constructed so that it is only necessary to energize momentarily one or the other of its two operating solenoids to pull it to one or the other of its operating conditions and the solenoid thereby being de-energized and the valve 288 will remain in the operating position so established. The same is true of the valve 274 for only momentary energization of the solenoids H or J is needed for causing the valve to be moved to the several operating conditions already mentioned.

Referring again to valve 288, when the solenoid G is energized, the clamp mechanism 25 is moved pneumatically to the bag clamping position. To accomplish this air is taken directly from the supply line 281, thence through the valve 288 to the line 291 and to the right end of cylinders 28, thereby causing the clamp mechanism 25 to engage the bag. The pressure for operating the clamp need not be accurately regulated. When the solenoid L is energized momentarily the valve 288 is moved to its other operating position, thereby permitting air to be exhausted from line 291 to atmosphere and air under pressure to be delivered from line 281 through the valve 288 and thence through line 295 to the opposite end of cylinders 28, thereby causing the clamp mechanism 25 to be moved to open clamp position.

From line 295 (for opening the clamp) a branch line 102 extends to the cylinder 101 previously described with reference to Figure 11, this cylinder being the one which, when air is introduced into it, causes the lock 104 to retract from the rod 93, thereby causing the bag fork 55 to be unlocked from the carriage.

Line 102 (Figure 26) is connected directly to line 295. Therefore, the spring in valve 101 always holds slider 104 (Figure 11) against bar 93 until pressure is applied to line 295 to open bag clamps. A valve is not necessary in line 102 to shut off this air at any time because in both instances where locking is not desired the notch in bar 93 does not come high enough, i. e. in filling large size paper bags the fork stays down and in filling 50-pound bags the bags are not clamped into the rollers high enough. The locking results only for large size textile bags to prevent excessive stretching of these bags.

Referring now to Figures 20, 21 and 22 the straight line diagrams therein show various set ups of the apparatus for versatile operation for various sizes or kinds of bags, or for operation on specific sizes or kinds of bags, where bag filling is regulated and controlled by movement of the carriage 35, either alone or in conjunction with the movement of the fork mechanism 55, the revolution counter switch mechanism of Figures 16–19 not being used in these diagrams.

*For filling large or small bags of various kinds, versatile set-up.*—Referring to the diagram, Figure 20, from line L1 a circuit extends through the normally closed contacts 138–189 of switch 193, operated by carriage 35, and thence through a normally closed emergency switch C, to junction 297 from which the circuit extends through a normally open contact D1 of the relay D and thence through junction 298 to bus 299, thence from bus 299 through the coil D of the holding relay to line L2. From line 299 a circuit also extends through the bag clamping solenoid G which, as previously decsribed, causes the operation of the bag clamp 25 to move to the clamping position. Accordingly, operation of relay D and energization of solenoid G to clamp the bag depends only upon closing a circuit from junction 297 to 298. A circuit can be established from junction 297 around the normally open contacts D1 of the relay D through the operator actuated foot switch E to junction 298. Accordingly, when the operator actuated foot switch E is moved to closed position, a circuit is established through the coil D of the holding relay and also through the bag clamp solenoid G. The bag is therefore clamped and relay D is operated. Relay D when operated causes contacts D1 to close, thereby holding a circuit from junction 297 to junction 298, regardless of release of operator actuated foot switch E. The ensuing operation depends upon the setting of the selector switch R which has one normally closed and two normally open contacts ganged together for manual operation, and the setting of the selector switch I which has two normally closed contacts ganged together. By working such switches R and I in different combinations several different types of operation can be quickly obtained.

With the circuits, as shown in Figure 20, that is with the switch R1–R2–R3 set so as to have switch R1 closed and switches R2 and R3 open, and with the switch I set so that the switch I1 is closed and I2 is also closed, the operation is for the filling of relatively small size (for example, 50-pound size) bags of either paper or textile material. With the switches as shown, a circuit is thereby also immediately established through contact R1 and coil Q, which is the time delay relay and a circuit is simultaneously established through contact I1 and through control solenoid H of the valve 274. Relay Q has a normally open contact Q1 which does not close until a predetermined time after the energization of the coil Q. This time delay is provided so that when smaller bags are being filled the motor and auger do not start so rapidly in respect to the remaining operations.

Therefore, after a predetermined time has expired, the coil F of the motor control is energized, and power is supplied over the power lines 300 to the motor leads 301 extending to the motor 20 and the motor operates. Before this occurred, however, the energization of coil H through the closed contact I1 moved the solenoid valve 274 to a position such that air is permitted to flow from the air supply tank 280 through the line 276 and thence through valve 274 to line 87, and to the under side of the piston in cylinder 86, thereby causing the support mechanism 55 to be elevated to a position such that it supports the bottom of the bag. As previously explained, the size of bag is relatively small and accordingly it is gripped only by the spring fingers 151—156 of Figures 13–15 and as the bag is filled, it would pull out from the spring clamping pressure of such fingers, were it not for the support provided by the fork 55. Accordingly, the motor 20 begins operation and material from the bin 11 is augered into the bag which is supported on its bottom by the fork lift 55. As the bag fills it moves down slowly against the upward pressure of the supporting fork 55. In this set-up of the machine, switches 193 and 200 are operated as shown in Figure 12b and carriage 35 therefore remains stationary, tank pressure being maintained above cylinder 50 throughout the cycle as R3 (Figure 20) is open. The downward movement of fork 55 is resisted meanwhile by the upward pressure of air in cylinder 86 which may be regulated in amount if desired. As the bag is filled, however, it pushes down on the fork 55 and overcomes such upward pressure in cylinder 86, thereby causing the rod 93 to move slowly downwardly. The switches 193 and 200 are mechanically operated, as shown in Figure 12b. Therefore, at a predetermined point in the downward travel of the fork 55 and the rod 93, the cam 208 of Figure 12b causes the operation of switches 193 and 200 simultaneously. When this occurs, the contacts 188—189 of the circuits previously described are opened, and the contacts 185—186 of switch 193 are simultaneously closed. Likewise, contacts 201 and 202 of the switch 200, which are normally opened, are closed. It may be noted that with this circuit arrangement the contacts 204 and 205 of the switch 200 are idle, so far as the circuits are concerned. With switches 193 and 200 thus operated, the circuit previously established through coil F of the motor controller is de-energized, and the motor accordingly immediately stops, and inasmuch as motor brake 21 is wired with the motor, the brake is immediately applied (by a spring) upon de-energization of the motor and brake. The motor therefore comes sharply to a stop. The closure of switch contacts 185—186 establishes a circuit through solenoid coil J of the valve 274, thereby shutting off the supply of air from the tank 280, through the line 87 to the under side of the piston in cylinder 86 and simultaneously venting the line 87 to atmosphere. This permits the piston in cylinder 86 to move rapidly downwardly under its own weight and that of the bag it supports and hence allows the fork support 55 likewise to move down from the full line to the dotted line position shown in Figure 26, thereby permitting the bag to be deposited upon the conveyor mechanism. It will be recalled that the top of the bag simply pulls out from under the roller clamp portion. Meanwhile the closure of contacts 201—202 of the bag switch 200 as rod 93 (Figure 11) goes down causes the energization of solenoid coil L with consequent operation of the valve 288 to a position to open the bag clamps, thereby facilitating insertion of the top of an unfilled bag under the rollers for the next operation.

The switch M of the above circuit is a manually operated open-close switch. In the open position no circuit is ever established through the coil N of the counting mechanism, but when the switch M is moved to the closed position, the coil N is energized once for each bag that is filled by the mechanism and de-energized when the bag is delivered. An armature, not illustrated, of relay N is mechanically connected to a counting mechanism, and it is possible accurately to keep count of the bags that are filled.

In the event a bag that is being filled should break and the mechanism desired to be stopped for this or for any other purpose, there is provided an emergency stop switch C which is movable by the operator from the normally closed to an open position. When open the motor relay F is de-energized, thereby halting the filling operation, but switch 193 has not been operated. Accordingly, to deliver a partially filled, possibly broken bag, and deposit it on the conveyor, there is provided the switch P which is in parallel with the contacts 185—186 of the switch 193. The switch P is manually operated by the operator whenever it is desired immediately to deliver the bag downwardly by means of the fork 55 and onto the conveyor. When switch P is thus closed, the fork mechanism 55 therefore descends and causes the operation of switch 200, as well as switch 193 through the mechanism shown in Figure 12b.

When the switch R1—R2—R3 is operated but switch I1—I2 remains in the position shown in Figures 20, a condition is established for the filling of large size textile bags, where it is desired to start the motor running and the filling operation immediately upon clamping the bag, but simultaneously provide for upward movement of the fork mechanism 55, for supporting the large and hence relatively weak textile bags. Hence, when switch R1 is opened and switches R2 and R3 are closed and switches 193 and 200 are operated as in Figure 12a, the operation of the circuit is as follows:

The operator presses on the foot switch E thereby establishing a circuit through the then closed contacts 188—189 of the switch 193 and through the normally closed contacts C through foot switch E to the bus 299 and thence through the coil of magnetic relay D. This operates relay D to close its contact D1, thus holding the circuit in parallel with the foot switch E, which may then be opened. Since the contact R2 has been closed, a circuit is also immediately established through the coil F of the motor controller, thereby closing the circuit to the motor 20 in order immediately to start the bag filling operation. There is no time delay in this operation. A circuit is simultaneously established through the coil G of the bag clamping solenoid, thereby causing the clamping mechanism G to move to the bag clamping position, and a circuit is also established to the then closed contact I1 and through the solenoid H of the valve 274, thereby causing the bag supporting fork 55 to be moved to the elevated position for supporting the bag. As the bag fills it not only pushes down on the supporting fork 55, which serves to take some of the weight of the bag, but the closure of clamp 25 upon the upper part of the bag causes the bag to pull downwardly upon the entire bag clamping mechanism 25 and hence upon the carriage 35. This occurs even if the fork is not locked to the carriage through bar 93. Therefore, the carriage 35 is drawn down simultaneously with the movement of the fork 55. When the fork mechanism 55 has moved downwardly sufficiently it again operates the contacts 193 and 200 as previously described. When the contacts 185—186 of switch 193 are thus closed, a circuit is estabilshed simultaneously through solenoid coil J and solenoid coil K. The energization of the coil J causes the fork mechanism 55 to be lowered, and the energization of the coil K of the solenoid operated valve 284 causes the carriage 35 to be pushed downwardly a slight amount as previously described. At the same time the closure of switch 200 causes the bag release solenoid L to be energized, thereby releasing the bag clamp 25.

In some forms of operations of this type it is desirable to separate slightly the positions of the elevations of switches 193 and 200. This is accomplished by mounting the switches as shown in Figure 12a, whereupon the switch 193 operates slightly before switch 200. The mountings of switches 193 and 200 are preferably adjustable as shown for switch 200 in Figure 12d thereby permitting easy adjustment. The effect of separating 193 and 200 vertically is to stop the operation of motor F and hence the filling operation without immediately releasing the clamp 25 by means of which the bag is held to the clamp mechanism 25 and hence carriage 35. As a result when switch 193 operates and coil J is energized, the fork mechanism 55 is lowered, allowing the bag to be lowered down without however being separated from the carriage 35, because at that time the bag clamp 25 has not released. Switch 200 is set to operate when the bag bottom is very close to the conveyor mechanism and operation of switch 200 thereby energizes the solenoid L to cause release of the bag clamp mechanism 25. This is of especial usefulness where it is desired not to drop a bag any substantial distance onto the conveyor. The drop should never be more than several inches for best results.

Where it is desired to fill large size paper bags, the switch R1 is open and switches R2 and R3 are closed, as just described, but in addition, the switches I1 and I2 are also open. When this is the switch setting, the fork mechanism 55 remains always down and the paper bag is not therefore supported at the bottom of the bag. For this operation the switches 193 and 200 are mounted so as to be operated as shown in Figure 12a. This is easily done by simply remounting the switches. It is usually best to leave cams 170 and 171 (Figure 12a), cam 208 (Figures 12b and 12c) and cam 213 (Figure 12d) in position and simply re-locate the switches 193 and 200 so as to be operated by the cams desired. The switches can be held in place by clamps or wing nuts and the lead wires made flexible and long enough to reach all positions. In that way the changes in position for various set-ups can be made in just a minute or two. Accordingly, for such large size paper bags, the bag filling is initiated as previously described for large size textile bags, and as the bag fills the downward pull of the filled and hence heavy bag upon the clamp 25 causes the carriage 35 to descend, and thereby through the cam 170 and 171 causes the sequential operation of the switches 193 and 200, as shown in Figures 12a. As switch 193 operates it causes the filling operation to be discontinued and the operation of switch 193 also establishes a circuit through its contacts 185—186 through the then closed contacts R3 to solenoid coil K which causes the operation of the air valve 284, as previously described, resulting in downward motion of the carriage. A little farther down in the movement of the carriage 35 switch 200 is operated by cam 171, thereby establishing a circuit through solenoid coil L, accordingly operating the bag clamp air valve 288 to move the bag clamp 25 to the open position, thereby permitting the bag to drop downwardly upon the conveyor belt. It will be noted from Figure 12a that in the lowermost position 191 the roller 176 has run off the upper end of the cam 70, thereby again permitting the switch 193 to resume its normal position separating contacts 185 and 186. When this occurs the solenoid coil K is deenergized, thereby permitting the valve 284 to return to the position where pressure of the air in tank 280 is again established above the piston 50 in the cylinder 49. This causes the carriage 35 immediately to reverse travel and move upwardly. As the carriage moves upwardly the upper end of the cam 170 is again brought against the roller 176, but this causes no difficulty because the roller simply lifts up and raises the push rod 182 away from the spring contact 183, thereby not moving the switch 193 from its normal position. As the cam 170 moves past the position 180 in the upward direction the roller 176 again falls down so as to bring the push rod 182 against the spring contact 183, but the mere weight of the roller 176 is not sufficient to operate the switch 193.

*For filling large size paper bags only.*—Referring now to Figure 21, in this figure there is shown the set-up of the machine for the filling of large paper bags only. When in such service the switches 193 and 200 are arranged to be operated as shown in Figure 12a. In this mode of operation when the foot switch E is closed, the circuit is established through the normally closed contacts 188–189 of the switch 193 and through the normally closed emergency switch C, through junction 297 and thence through the closed foot switch E, through junction 298 and to the bus 299 from which a circuit extends directly through the motor controller, from which a circuit extends through the coil of holding relay D the coil of the motor controller F and the coil G of the bag clamp solenoid. The operation of relay D establishes its self-holding circuit through its contacts D1 around the foot switch E, thereby permitting the operator to remove his foot from such switch. The energization of the motor controller relay F establishes a circuit from the feed lines 300 to the motor lines 301 and hence to the motor 20, thus causing operation of the motor and release of brake 21. The energization of the bag clamp solenoid G causes the movement of the valve 288 to a position such that the bag clamp 25 is moved to bag clamping position. In the event the manually operated counter-switch M is in the switch closed position, a circuit is also established through the counter relay N which moves the counter one digit for each energization. The bag is accordingly filled, and as it is filled the carriage 35 moves downwardly, as shown in Figure 12a, thereby eventually effecting an opening of the contacts 188–189 and a closure of the contacts 185–186. The opening of contacts 188–189 de-energizes the motor controller F and also relays D, G and N, the latter if the switch M is closed. When the motor 20 stops the filling operation also ceases. The closure of contacts 185–186 of the switch 193 causes the operation of solenoid K which accordingly moves the packing cylinder control valve 284 to a position such that air is delivered from above the piston through lines 51 to atmosphere. It will be remembered that the bag is still clamped to the carriage at this time, and as the bag hence descends, the carriage also moves down and causes the operation of switch 200, thereby closing contacts 201–202 to establish the circuit through solenoid L of the direct clamp control valve 288, which causes the bag clamp to move to open position, thereby permitting the bag to be deposited downwardly upon the conveyor, which is constantly operating. The bag is therefore moved away to the left, as shown in Figure 1. As previously described, this downward movement of the carriage 35 causes the roller 176 to move off the upper end of cam 170, thereby again permitting the switch 193 to move to its normal position which through the de-energization of solenoid K permits the packing cylinder control valve 284 to be moved by its return spring to its normal position, thereby causing pressure to be delivered to the upper side of the piston 50 in cylinder 49 with consequent movement of the carriage 35 in the upward direction preparatory to the next cycle.

The operation of the emergency stop button C and the reset button P are as previously described with reference to Figure 20.

*For filling large size paper or textile bags.*—Referring to Figure 22 there is illustrated a set-up of the apparatus for the filling of large size paper and textile bags. The operation in this instance includes the up and down time movement of the supporting fork 55 which engages the under side of the bag so as to support especially the weaker textile bags, and in any event to control the movement by which the bag is deposited downwardly (rather than dropped) onto the conveyor. In this set-up the switches 193 and 200 are operated as shown in Figure 12a. For this operation the H and J solenoids for control cylinder 86 and its solenoid operated valve 274 are utilized, and these solenoids are arranged so as to be included (for textile bag operation) or excluded from the circuit (for paper bag operation) by means of selector switch I. It will be observed that when the switch I, which has two contacts I1 and I2 ganged together, is moved so as to open both of its normally closed contacts, the circuit in Figure 22 will be precisely the same as that shown in Figure 21 and the operation is the same as in that figure.

When it is desired to fill large textile bags the contacts I1 and I2 of the switch I are moved to closed position and the solenoids H and J which control fork 55 are operated in proper sequence so as to provide bottom support for the textile bags.

Thus, upon starting of the motor by energization of the bus 299, as previously described with reference to Figure 21, a circuit is also established through the solenoid H (assuming switch I is in its closed contact position). This causes movement of the valve 274 to a position such that air is introduced from the air tank 280 to the under side of the piston in cylinder 86, thereby causing the fork mechanism to be moved to the elevated position so as to engage and support the textile bag which is meanwhile clamped upon the spout by operation of bag clamp solenoid G. As the bag is filled, switches 193 and 200 are operated in sequence according to the mechanism shown in Figures 12a and when contacts 188—189 of switch 193 open, this causes the operation of motor F to be halted, thereby halting the filling operation, and the closure of its contacts 185—186 establishes a circuit through the solenoid coil J (switch I being closed). The energization of the solenoid coil J causes the valve 274 to be moved to a position such that air is exhausted from the under side of the piston in the cylinder 86 and the fork mechanism 55 is permitted to move downwardly. At the same time the solenoid operated valve 284 is operated as previously described due to the energization of the solenoid K, thereby causing the carrier 35 to be moved downwardly. This downward movement of the carriage 35 causes the operation of switch 200 with consequent energization of the bag release solenoid L as previously described, thereby depositing the filled bag upon the conveyor, the carrier 35 being meanwhile moved upwards by pneumatic action as described above. When the switch I is moved to the open position the operation is precisely the same as in Figure 21 and then paper bags only should be filled on the machine.

*For filling large or small paper or textile bags with auger revolution counter control.*—Referring to the straight line diagram shown in Figure 23 there is illustrated a versatile set-up of the machine adapted for a variety of operations, depending upon settings of gang switches R and I. In a first condition of operation where switch R1 is closed and switches R2 and R3 are opened, and where switches I1 and I2 are both closed, the machine may be used for the filling of small size paper or textile bags. When the switch R1 is open and switches R2 and R3 are both closed, and switches I1 and I2 are also closed, the machine is adapted for the filling of large size bags, either paper or textile intermixed. In a third condition of operation where switch R1 is open and switches R2 and R3 are closed and switches I1 and I2 are both open, the machine is set up for the filling of large size paper bags. In this set-up of the machine the auger revolution counter mechanism (switch 225) shown in Figures 16 through 19 is used, this being shown in Figures 16 through 19. The revolution counter switch 225 which has normally closed contact 225NC and a normally open contact 225NO replaces the switch 193 used in previously described machine set-ups. The switch 225 (microswitch) is only operated momentarily, and this necessitates holding relays for the circuits thereby controlled. To initiate operation, the foot switch F is closed by the operator, and a circuit is established from line L1 through the normally closed contacts 225NC of the switch 225 through the normally closed emergency switch C to junction 305 and thence through the switch E which is closed to junction 306 and through coil D of magnetic relay No. 2 which becomes operated and closes its normally closed contact D1 which establishes a circuit in parallel with the foot switch E and closes its normally open contact D2 which therefore establishes a circuit from line L1 through contact D2 to the bus 307, whereupon the following occurs:

*For filling small paper or textile bags (Figure 23).*— Assuming the switch R is in the position shown in Figure 23, with contact R1 closed and contacts R2 and R3 open, and assuming further that the switch I1 is closed and I2 is closed, the following circuits are then established, it being assumed further that the cam set-ups are as in Figure 12c.

From bus 307 a circuit is established through coil A of the revolution counter switch 225, thereby moving the clutch of that mechanism to the clutch-engaged position, see Figure 16. This causes the revolution counter switch 225 to be in a condition such that it will count the number of revolutions of the auger 14 when the latter revolves. A circuit is also established from bus 307 through the bag clamp solenoid G, thus moving the bag clamp 25 to the closed position, thereby bringing the resilient mounted rollers, Figures 13 through 15 to a position to engage resiliently the upper end of a relatively small size bag (paper or textile) preparatory to filling. Since contact I1 is also closed a circuit is established through coil H and solenoid operated valve 274 is moved to a position such that air is introduced under the piston in cylinder 86 and the fork 55 is elevated. Since switch R1 is closed, a circuit is also established through the coil Q of the time delay relay which initiates the operation of that relay and after a predetermined time interval contacts Q1 of such relay are closed, thereby establishing a circuit from bus 307 through the then closed contacts Q1 and through the coil F of the motor controller, accordingly supply a circuit from the power mains 300 to the motor lines 301, thereby starting the operation of the motor 20 with consequent rotation of the auger 14 for filling the bag. After a predetermined number of revolutions have occurred the clutch member 244 is rotated so as to bring its protuberance 260 into engagement with the operating stem 261 of the microswitch 262 within the revolution counting switch mechanism 225. When this occurs the switch contacts 225NC are opened and switch contacts 225NO are simultaneously closed. The opening of contacts 225NC de-energizes coil D, thereby opening contact D2 to break circuits through bag clamp solenoid G, fork elevating solenoid H, time delay relay Q, the motor control relay F, and the revolution counter clutch solenoid A of the switch 225. Accordingly, the switch 225 immediately resets to initial position, thereby immediately again closing 225NC and opening contacts 225NO. However, in the short time that contacts 225NO are closed, a circuit is established from line L1 through contact 225NO and thence through the then closed contacts 204—205 of switch 200 and through the coil of holding relay X, thus establishing a circuit through relay contacts X1 so as to maintain the circuit closed to relay X and also establishing a circuit through relay contacts X2 so as to establish a circuit from line L1 through contact X2 to junction 398 and thence through contacts I2 which are then also closed, and to solenoid J of valve 274 controlling the fork support 55. Accordingly, fork 55 is permitted to move downwardly. When this occurs, the momentary opening of contacts 225NC caused the de-energization of coil of relay D, thereby opening its contacts D1 and D2, thereby de-energizing all circuits previously established through such contacts. The switch 200 is operated as shown in Figure 12c (since carriage 35 remains stationary) and the downward movement of the fork 55 accordingly moves the cam 208 into contact with the roller 194, thus to operate switch 200. When the switch 200 is operated, the opening of the normally closed contacts 204—205 causes the deenergization of the relay X and the simultaneous closing of the contacts 201—202 causes the bag clamp solenoid L to be energized, thereby moving the bag clamp valve 288 to a position to release the bag clamp 25. This release is not necessary for the lowering of the bag since it was only resiliently held by the resiliently mounted spring fingers shown in Figures 13–14, but the opening is in preparation for the easy insertion of another bag. Since only small size bags are being filled, the carriage 35 does not in this operation move from its elevated position, it being noted that valve 296 (Figure 26) is closed in this set-up. Where it is desired to stop the machine, as where a bag breaks etc., the operator has only to push the emergency button C which therefore stops the filling operation. The operator then pushes the re-set button P which causes the fork mechanism 55 to be lowered immediately to deliver the (broken) bag and the bag delivered, thereby operating the switch 200 to release the clamp as previously described.

*For filling large paper or textile bags (Figure 23).—* For the second condition of operation the switch R is moved so as to open its contact R1 and close its contacts R2 and R3 and switch I is positioned so that its contacts I1 and I2 are both closed. Cam set-up of Figure 12d is used. This permits the supporting fork 55 to be operated so as to provide bottom support for the bag. However, the time delay relay Q is not operated since large bags are being filled, and the motorized filling operation starts immediately upon pressing of the foot switch E. This operation is accomplished as follows:

Closure of the switch E establishes the circuit through the then closed contacts 225NC and then closed emergency switch C, junction 305 and through the switch E to junction 306, thus establishing a circuit through relay D which upon closure establishes a holding circuit through its contacts D1 and also establishes a circuit to its contact D2 from line L1 to bus 307.

It may be noted parenthetically that in Figure 23, relay D has two contacts D1 and D2, whereas in the diagrams of Figures 20–22, this relay had only one contact D1. The reason for the extra contact is one of design, for by supplying an extra contact D2 of adequate size, all relays and coils supplied by bus 307 (Figure 23) are separately supplied, thus relieving the load on microswitch 225NC. This same design feature may be incorporated in Figures 20, 21 and 22, if desired.

Since contact R2 is assumed to be closed, a circuit is immediately established from bus 307 through the motor controller coil F to line L2, thereby causing the motor operation to begin and through solenoid coil G to clamp the bag. Simultaneously, if switch M is closed, the bag counter coil is likewise energized, thereby causing one digit of the bag counter to be recorded. If switch M is open no count is made. Likewise, the solenoid coil A of the switch 225 is energized, thus causing the revolution counter to be initiated. Switch I1 is also closed, the solenoid coil H is operated, thereby causing the fork 55 to be moved to elevated position to support the bag, which is clamped due to energization of clamp solenoid G. The bag filling operation thus being immediately initiated, quickly begins and the fork 55 and carrier 35 both move downwardly. The switch 200 in this form of operation is operated as shown in Figure 12d. After a predetermined number of revolutions of the auger 14 the switch 225 operates, momentarily opening its contacts 225NC and momentarily closing its contacts 225NO. The ensuing operation resulting from the operation of switch 225 has been described above and the bag is deposited as previously described.

*For filling large size paper bags only (Figure 23).—* For this condition of operation of the set-up shown in Figure 23, the switch 200 is operated from carriage 35, as shown in Figure 12d, and switch R1 open and switches R2 and R3 closed and switches I1 and I2 open. So adjusted, the machine is set up for the filling of large size paper bags and the operation is precisely as previously described, except that the fork mechanism 55 is not elevated so as to support the bottom of the bag. It will be observed that when switch I1 is open, no circuit is established through solenoid H from bus 307 to line L2 and hence upward movement of the fork 55 does not occur upon initiating the cycling of the machine. Large size multiwall paper bags can be safely supported solely from the bag clamp 25 on carriage 35. Likewise, at the end of the cycle, switch I2 being open the solenoid J is similarly not energized and the fork would not be brought, it being noted that the fork is already down. Otherwise, the operation is precisely as previously described for filling large size paper or textile bags.

Referring to Figures 24 and 25, these diagrams are the same except that in Figure 24 the fork-controlling solenoid coils H and J are included and there is provided the selector switch I by means of which such solenoid coils may be brought into or left out of service.

*For filling large size paper or textile bags with revolution counter control for auger (Figure 24).—*Solenoid coil H controls the operation of the valve 274 so as to apply tank pressure to the under side of the piston in cylinder 86 for supporting the fork 55 and elevating the same, whereas the solenoid coil J when energized causes the lowering of the fork. The support of fork 55 is provided especially when it is desired to fill textile bags of large size which need bottom support during filling. This is achieved in the Figure 24 set-up by moving the gang switch I to a position such that I1 and I2 are closed. Therefore, referring to Figure 24, assuming switch I to be moved to the closed position so as to close its contacts I1 and I2, then when the foot switch E is closed, a circuit is initiated from line L1 to the normally closed contacts 225NC and through the normally closed emergency switch C to junction 305, through the then closed contact E to junction 306 and through the coil of relay D to line L2. When relay D operates it closes its normally open contact D1 and D2, D1 serving to establish a holding circuit around the foot switch E, thereby permitting the operator to remove his foot from such switch. The closure of contact D2, as previously described, applies voltage of line L1 to bus 309, thus causing the operation of the relay F, thereby supplying current from line 300 to the motor lead 301 to cause the operation of motor 20. Where the manual switch M is closed the counter relay N is likewise energized, thereby causing one digit to be registered on the counter. The clutch operating solenoid A of the revolution counter switch 225 is likewise energized, thereby placing switch 225 in a condition such that it will count the revolutions of the auger 14 when the latter is rotated by the motor. Since switch I1 is assumed to be closed the solenoid H is likewise operated, causing the fork 55 to be elevated pneumatically and solenoid G is likewise operated, causing the bag clamp 25 to be moved to the closed position. The bag is thus clamped and provided with bottom support. The bag-filling operation then continues until the auger 14 has made a predetermined number of revolutions, whereupon switch 225NC is momentarily opened and switch 225NO is momentarily closed. The opening of switch 225NC momentarily causes the de-energization of relay D, thus opening contacts D1 and D2 and de-energizing all circuits controlled by such contacts. The momentary closure of contacts 225NO establishes a circuit through relay X thus closing normally open contacts X1 which establishes the holding circuit to relay X and closing contact X2, thereby establishing a circuit to the solenoid K of valve 284 which accordingly permits the air above the piston 50 in cylinder 49 to flow through lines 55 and valve 284 to atmosphere. Line 52 beneath the piston 50 is connected to tank pressure, thus causing the piston rod 48 to be lifted and the carriage 35 to be brought smartly downward. Simultaneously, solenoid J is operated (since switch I2 is also closed), thereby permitting the cylinder 86 to exhaust through valve 274, accordingly lowering the fork support 55 so as to allow the bag which is then filled to move downward. The downward movement of the carriage 35 causes the operation of switch 200, which is then set up according to the plan shown in Figure 12d, and this causes the operation of the switch 200, thereby closing contacts 201—202 to energize the solenoid L by releasing the bag clamp 25. At the same time contacts 204—205 of switch 200 are opened, thus de-energizing relay X, thereby causing opening of contacts X2, thus de-energizing solenoid K and the internal spring within valve 284 returns it to a position such that air is introduced under pressure from tank 280 through valve 284 to the upper surface of piston 50 within the cylinder 49 thereby causing the carriage 35 to be elevated.

*For filling large size paper bags with auger revolution counter control, Figure 24 second condition and Figure 25.*—Assuming the switches I1 and I2 of Figure 24 to be open, the diagram of Figure 24 is then precisely as shown in Figure 25, and in this condition (Figure 24 with switches I1 and I2 open, or Figure 25) the operation is especially suitable for the filling of large size paper bags with which the bag bottom support provided by fork 55 is not required. Since the fork operating solenoids J and H are not energized (in Figure 24 with switches I1 and I2 open) and not included in Figure 25, the fork remains constantly down. Otherwise the operation is the same as previously described with reference to Figure 24.

Figure 26 is a schematic view mostly showing the air circuits and controls. In this figure bag clamp 25 supported on carriage 35 supports bag B, as previously described. Fork 55 is shown supporting the bag bottom and may be moved down to the dotted position as during lowering the bag, or left down, as when large multiwall paper bags are used.

Cylinder 49 and piston 50 (through piston rod 48 and cable 45) control the position of the carriage 35, clamp 25 and bag B carried thereby. Cylinder 86, piston 88 and piston rod 84 control the fork 55, which is connected via rod 93 and air operated latch 101 to the carriage 35 during some operations, as herein described.

Air pressure tank 280 serves the cylinders 49 and 86 of the machine and is itself supplied with air via line 281, through pressure regulator valve 281A. Hence, air in tank 280 is maintained under close pressure control, thus closely determining the pressures at which cylinders 49 and 86 operate. Line 276 from tank 280 extends to valves 274 and 284. When solenoid K of valve 284 is not energized the air circuit is complete from tank 280, line 276, line 286, valve 284, line 51, and line 52 is then vented to atmosphere. When solenoid K is energized, line 51 is connected through valve 284 to line 52, and line 286 is cut off and pressure which was above piston 50 in cylinder 49 then equalizes above and below the piston 50. Valve 296 checks too rapid flow in line 51 from cylinder 49 to valve 284 but does not check the other direction. Valve 284 is spring loaded and returns to its first position whenever solenoid K is de-energized.

When solenoid H is energized valve 274 is open, allowing pressure in line 276 to be exerted via valve 274 and line 87 to the under side of piston 86A, thus determining the support pressure of fork 55. When solenoid J is energized valve 274 is moved so as to close off pressure line 276 and exhaust cylinder 86 and line 87 to atmosphere. Valve 87A may be used to regulate the rate at which cylinder 86 and line 87 are exhausted (and hence fork 55 is lowered).

Solenoid operated valve 288 is served through line 290 via valve 290A which regulates pressure on valve 288. When solenoid G is energized valve 288 is set to deliver air via line 291 to move bag clamps 25 to clamp the bag, line 295 being meanwhile exhausted, and when solenoid L is energized, line 291 is exhausted and pressure is applied to line 295, thus opening the bag clamp 25. Cylinder 101 is operated via line 102 from line 295, shut-off valve 102A being optionally included. The mode of operation of cylinder 101 is elsewhere explained herein.

*For filling bags utilizing selective control by means of bag position auger switch (193) or revolution counter auger switch (225).*—Referring to Figure 27, this figure shows a stright line diagram illustrating the manner in which the various components are connected when it is desired selectively to control the bag filling operation, either by (1) bag position auger switch 193, or (2) the auger revolution counter switch 225. The type of connection shown in Figure 27 may be applied to any of the modes of operation and connection of the apparatus shown in the previously described straight line diagrams, and it is therefore only illustrative of the changes needed. For simplicity Figure 27 is here applied as a revision of the straight line diagram circuits shown in Figure 25, which shows the set-up of the apparatus for filling large paper bags only. In Figure 25 the filling operation was controlled by the number of revolutions of the bag filling augering mechanism, whereas in Figure 27 the filling operation is controlled selectively by either the position of the bag (as determined by the bag clamp carrier 35) or by the number of revolutions of the augering mechanism 14, depending upon the position of the manual selector switch U1—U2—U3. Referring in detail to the diagram it will be noted that a three-pole double throw selector switch V1—V2—V3 is included, the three poles of the switch being ganged together for simultaneous operation. In one position the switches V1 and V2 are closed, whereas the switch V3 is open, and when so operated the control is dependent upon the auger revolution counter switch 225. When this gang switch is thrown to its other position the individual switches V1 and V2 are open, whereas switch V3 is closed, and in this condition filling control depends upon the operation of the bag position switch 193. The set-up of Figure 27 therefore includes switch generally designated 193 which is composed of a pair of normally closed contacts 188—189 and a pair of normally open contacts 185—186 that are operated by the cam mechanism 170 mounted upon the bag clamp carrier 35. In Figure 27 there is also included the bag delivery switch 200 which serves when actuated to deliver the bag downwardly. This switch is composed of one normally open pair of contacts 201—202 and one pair of normally closed contacts 204—205 which are ganged together for simultaneous operation by means of a cam mechanism 171 which is also mounted upon the carrier 35. Switches 193 and 200 are set up as illustrated in Figure 12a. Where the selective control (by switch 193 or 225) is applied to the setup illustrated in the other straight line diagrams (Figures 20, 21, 22, 23, 24) the cams for operating switches 193 and 200 and the locations of such switches are as previously described with reference to such other diagrams.

In Figure 27 there is also included the auger revolution counter switch 225, Figures 16 through 19, which serves to measure the number of revolutions turned by the auger mechanism 14 during the bag-filling operation. This switch has a pair of normally closed contacts 225NC and a pair of normally open contacts 225NO which are ganged together so as to be operated by the gear driven mechanism shown in Figures 16–19, after the revolution counter has turned a prescribed number of revolutions, which may be regulated by the operator.

Assuming that the selector switch V1—V2—V3 is in the position shown in Figure 27, the apparatus will then operate responsive to the switch 225 which measures the number of revolutions turned by the auger 14, and the operation is precisely as described with reference to Figure 25. The first operation, as with reference to Figure 25, is the closure of the switch E. When this occurs a circuit extends from junction 320 on line L1, thence through the then closed contact V2 to junction 321 and through the then closed contacts 225NC of the switch 225 and through the then closed emergency switch C to junction 305, then through the foot switch E which is closed and through junction 306 and coil of relay D to line L2. This causes the operation of the two normally open contacts D1 and D2 of relay D. The contact D1 of relay D closes a circuit around the foot switch E, thus permitting the operator to remove his foot from the switch. Contact D1 accordingly is a self-holding contact for the circuit of relay D. The contact D2 establishes a circuit from line L1 through contact D2 to bus 307. From bus 307 a circuit is established through switch M (if the latter is closed) and through the coil N to accomplish the counting operation. A circuit is also established through the then-closed switch V1 and through the clutch operating solenoid coil A of the revolution counting switch 225. This causes the clutch of such revolution counting switch to be engaged and the switch mechanism 22 is set to operate when the auger mechanism turns and to determine the number of revolutions of such auger. As the same time a circuit is established through the solenoid G which causes the operation of the solenoid operated air valve 288 to a direction such that it introduces air into the bag clamp to close the bag clamp 25, thus causing the bag clamp 25 tightly to grip the bag top. At the same time a circuit is established from bus 307 through coil F of the motor control switch, thus establishing a circuit to the motor 20 to cause the rotation of the motor with consequent turning of the auger 14 for bag filling.

After the auger has turned a prescribed number of turns the switch 225 is operated, thus opening the normally closed contacts 225NC and closing the normally open contacts 225NO. When the contacts 225NO are closed, a circuit is established from line L1 through the then closed contact 204—205 of the switch 200, thus establishing a circuit through the coil of relay X which accordingly operates, closing its normally open contacts X1 and X2. The closure of contacts X1 serves to establish a circuit around the contact 225NO, it being remembered that the switch 225 operates only momentarily. However, as soon as relay X is energized it closes its sustaining circuit through contact X1 and relay X remains energized until the switch 200 is then operated. Contact X2 establishes a circuit from line L1 through solenoid K, which causes the operation of the solenoid operated valve 284, thus permitting the air under pressure above the piston 50 in cylinder 49 to flow through the piping 51, valve 84 and exhaust to atmosphere and permitting tank pressure to apply to the under side of piston 50, thus causing the upward movement of the piston 50 and piston rod 48 so as to cause the entire carrier 35 which holds the bag clamp and the bag to be moved smartly downwardly for bag delivery to the conveyor.

The opening of the normally closed contacts 225NC of the revolution counting switch 225 causes the circuit which had been maintained through the coil of relay D to line L2 to be interrupted. Accordingly, the relay D becomes de-energized and opens its contacts D1 and D2. It will be recalled again that the opening of contact 225NC is only momentary, but as soon as the relay D drops out, it breaks its own self-holding circuit at contact D1. The opening of relay contacts D2 has the effect of de-energizing the coil F to stop the motor 20 from de-energizing the coil N (assuming switch M to have been closed) so as to re-set the counting mechanism for another digital count, of opening the circuit to the solenoid coil A of the revolution counting switch 225, thereby permitting said switch to re-set to zero position preparatory to another cycle, and de-energizes the solenoid G of the valve 288. The valve 288, however, does not move to its opposite position until its solenoid L is operated. Accordingly, as the auger stops the filling operation but the bag being still clamped to the carrier 35, causes it to move downwardly, such movement being pneumatically assisted as above described. This downward motion is due partly to the weight of the bag which is still clamped to the carrier by means of the bag clamp 25, and partly due to the spurt of air underneath the piston 50, all as described above. As the bag, bag clamp 25 and carrier 35 all descend together, a position is reached where switch 200 is operated, thus causing its normally open contacts 201—202 to be closed and its normally closed contact 204—205 to be opened. When contact 201—202 closes a circuit is made to the solenoid coil L, thus causing the solenoid valve 230 to be moved to the position such that the bag clamp 25 is opened. This permits the bag to fall the short remaining distance downwardly onto the conveyor. The cam 171 for operating the switch 200 is regulated so that the bag clamp is opened when the bottom of the bag is a very short distance above the conveyor belts, so that the bag does not fall any substantial distance. When the normally closed contacts 204—205 are opened, the relay X drops out, thus breaking its self-sustaining circuit at contact X1 and breaking the circuit through solenoid K of valves 284, thus permitting the valve 284 to move under the influence of a return spring to its original position where the pressure of air in tank 280 is applied through the valve 284 and the pipe 51 to above the piston 50 of the cylinder 49, preparatory to the next operation.

This is a complete cycle of operation when the switch V1—V2—V3 is in the position shown in Figure 27.

When the switch V1—V2—V3 is moved to its other operating position, opening V1 and V2 and closing V3, the apparatus operates in substantially the same mode as described with reference to Figure 21, although the mechanisms are slightly different. It will be noted by comparing Figures 21 and 27 that in Figure 21 the bus 299 is fed directly through a circuit from line L1, normally closed contacts 188—189 of the switch 193, through the emergency stop switch C, the then closed contacts D1 and through junction 298 to bus 299. An additional contact is applied to relay D for the service in Figure 27, so that the bus 307 of Figure 27 is fed through the contact D2, thus sparing the microswitch 225NC of the additional load incident to the energization of coils F, N, A and G of Figure 27. The microswitch 225NC probably has a current rating too low to carry these currents. This is merely a design expedient. Likewise, in Figure 27 there is included the relay X with its two normally open contacts X1 and X2 that are included due to the fact that the revolution counting switch 225 operates only momentarily. However, relay X does not operate when the switch V1 is open, as now being described, because the switch X is responsive to the momentary closure of the normally open contacts 225NO of the revolution counting switch 225, and such revolution counting switch is operated only when its clutch solenoid A is energized, the latter being energized through the switch V1. Accordingly, in this mode of operation with the switch V1 and V2 open and V3 closed, the relay X never operates.

When the switch V1—V2—V3 is so positioned, the operation is again started by closing the foot switch E which establishes a circuit through then closed switch V3 and through the then closed contacts 188—189 of the switch 193 and through lines 322 to junction 321 and through the closed contact 225NC of the switch 225 (which will remain constantly closed, since the switch 225 will not be operated as described above), then through the emergency switch C, through the then closed foot switch E and through the coil D to line L2. The relay D accordingly operates closing its self-sustaining circuit through contact D1 and closing contact D2 to energize bus 307 and hence to energize coils F, N (providing switch M is closed) and G, all as previously described. The energization of coil F closes the motor circuit, the energization of coil N counts one digit, and the energization of solenoid G causes the bag clamp to move to bag clamping position. The motor therefore starts and the bag filling operation begins. When the bag is sufficiently full the weight of the material in the bag, together with the downward pressure of the material being augered into the bag, causes the bag and the carriage 35, as well as the bag clamp 25 to move downwardly, all as previously described. At a certain position, which is predetermined by the adjustable setting of the position of switch 193 of Figure 12a, and adjustment of cam 170, the cam 170 operates switch 193, thus opening the normally closed contacts 188—189 and closing the normally open contacts 185—186. The opening of contacts 188—189 breaks the circuit to relay D, thus de-energizing the motor F, resetting the counter for another count and de-energizing the solenoid G of the bag clamp. However, the bag clamp does not move to unclamping position until the solenoid L is energized which shortly follows. Since switch V3 is assumed to be closed, a circuit is established from line L1 through switch V3 to junction 324 and thence through the then closed contacts 185—186 of the switch 193 and then through circuit 325 to solenoid coil K to line L2, thereby causing the operation of the air valve 284 so as to permit the air under pressure above piston 50 to be allowed to exhaust and permitting tank pressure to apply to the under side of piston 50, thus causing the bag, bag clamp 25 and carrier 35 to be given a downward impulse of motion. As the bag, bag clamp 25 and carrier 35 thus move down, they reach a position such that the cam 171 operates the switch 200, closing contacts 201—202 so as to energize the solenoid L and thus cause the opening of the bag clamp 25 to permit the bag to be dropped, the short remaining distance to the conveyor. Contacts 204—205 of switch 200 are also opened but this has no effect because relay X was not energized anyway, as previously mentioned. The downward movement of the carrier 35 has by this time caused cam 170 to pass off the operating roller 176 which actuates switch 193, thereby permitting the air valve 284 to return to its normal position such that air under pressure from tank 280 is introduced above the piston 50 in cylinder 49. When thus introduced the air pressure causes the carrier 35 and bag clamp 25 to be elevated again to the starting position and the apparatus is ready for the next cycle.

*For filling bags with automatic recycling without operator foot switch.*—Referring to Figure 28, there is illustrated in this figure the manner in which the machine is made entirely automatic so as to accomplish recycling of the machine without operation of the operator foot switch E. All that the operator has to do with such a set-up is merely to feed the bags into the open bag clamp at the proper time (after the machine is once started), and the machine thereafter carries out the cycle and continues through subsequent cycles, the operator merely feeding the bags to the machine in proper time with the machine. This type of automatic recycling can be applied to any of the set-ups of diagrams Figures 20–27, but for simplicity is illustrated with reference to the diagram of Figure 25. By comparison of Figures 28 and 25 it will be observed that another relay U has been added (it appears below the relay coil D and above the relay coil K). The relay U is a timer relay and has a single contact U1 which is in parallel with the foot switch E. In addition, the relay D has been provided with an additional contact D3 in the circuit of the timer relay U. Accordingly, for this automatic recycling, a bag is placed on the clamp and to start the operation the foot switch E is closed, and this causes the first cycle of operation in precisely the manner described with reference to Figure 25. At the end of the first cycle, when relay D is de-energized its normally closed contacts D3 (which had been opened due to the energization of relay D) then closed and energized the coil U of that timer relay, thus initiating the timing cycle. After a prescribed interval the contacts U1 of the relay U close, thus again establishing a circuit to the relay D (which would in the operation of Figure 25 have been established by the closure of the foot switch E). In this way the second cycle of operation is initiated. Before the closure of the contact U1 the operator has already inserted a fresh unfilled sack in a position to be engaged by the bag clamp and he holds the bag momentarily until the clamp closes. Otherwise, the cycling is precisely the same as with reference to Figure 25. When the operator wishes to interrupt the cycle he has only to open the emergency switch C which therefore stops the cycling. The relay U is of the adjustable type, thus permitting the time delay (before initiation of each subsequent cycle) to be varied.

As many apparently widely different embodiments of this invention may be made without departing from the spirit and scope thereof, it is to be understood that I do not limit myself to the specific embodiments herein.

What I claim is:

1. In a bag filling machine a hopper having a downwardly extending spout through which material to be bagged is delivered, an auger in said spout for forcing the material downwardly therethrough, a carriage frame shaped to embrace the outside of the spout, said carriage being movable up and down on the spout, bag clamp means movable from clamping to unclamping position mounted on the carriage and movable therewith for holding the open mouth of a bag thereon as the carriage is moved, means for initiating rotation of said auger and means responsive as the carriage moves downwardly due to the downward pull of the bag of material suspended therefrom for interrupting rotation of said auger.

2. In a bag filling machine a hopper having a downwardly extending spout through which material to be bagged is delivered, an auger in said spout for forcing the material downwardly therethrough, a carriage frame shaped to embrace the outside of the spout, said carriage being movable up and down on the spout, bag clamp means movable from clamping to unclamping position mounted on the carriage and movable therewith for holding the open mouth of a bag thereon as the carriage is moved, means for initiating rotation of said auger, means responsive as the carriage moves downwardly due to the downward pull of the bag of material suspended therefrom for interrupting rotation of said auger and said bag clamping means being moved to open position to release the bag in response to downward movement of said carriage.

3. In a bag filling machine a hopper having a downwardly extending spout through which material to be bagged is delivered, an auger in said spout for forcing the material downwardly therethrough, a carriage frame shaped to embrace the outside of the spout, said carriage being movable up and down on the spout, bag clamp means movable from clamping to unclamping position mounted on the carriage and movable therewith for holding the open mouth of a bag thereon as the carriage is moved, means for initiating rotation of said auger, means responsive as the carriage moves downwardly due to the downward pull of the bag of material suspended therefrom for interrupting rotation of said auger and means provided to move said bag clamp to clamping position, as said auger rotation is initiated.

4. In a bag filling machine, a hopper having a downwardly extending spout through which material to be bagged is delivered, an auger in said spout and means for rotating said auger for forcing material downwardly through said spout, a carriage frame shaped to embrace the outside of the spout, said carriage being movable up and down on the spout, bag clamp means movable from clamping to unclamping position mounted on the carriage and movable therewith, means for actuating said clamp means to bag engaging position, and stop means responsive to predetermined downward movement of said carriage during the filling operation for stopping rotation of said auger.

5. The apparatus of claim 4 further characterized in that said bag clamp is constructed so as to grip the bag mouth only resiliently, said bag bottom supporting means being movable downwardly as the bag is filled.

6. In a bag filling machine, a hopper having a downward delivery spout through which material to be bagged is delivered, bag support means for holding a bag with the spout extending into the open mouth of the bag, means mounting said bag support means for vertical movement downwardly under the weight and pressure of material filled thereinto, and means for counterbalancing said bag support during filling comprising a pneumatic cylinder and piston therein, at least one of said elements being connected to the bag support means so as to be moved thereby due to the supported weight and pressure of material in the bag, air ports at each end of the cylinder, air pressure supply and valve means and connections therefrom to the air ports of the cylinder, said valve means being movable to a position for connecting to the air pressure supply that end of the cylinder toward which the piston moves when said piston is moved due to the force of the bag support means and for simultaneously exhausting the opposite end of said cylinder.

7. The apparatus of claim 6 further characterized in that said valve means is movable to another position to close the air supply and said exhaust and connect both parts of the cylinder together for delivering air under pressure from one end of the cylinder to the other end of the cylinder for moving the piston and thereby moving the bag support means connected thereto to a lowered position.

8. In a bag filling machine having means for introducing material to be bagged into the upper open end of the bag, means comprising a fork of generally parallel spaced tines for engaging and supporting the bottom of the bag, means mounting said fork for up-and-down movement, a conveyor for filled bags having a plurality of spaced conveyor strands mounted so as to run substantially parallel in spaced relation from a position below said bag to a remote position, said fork and conveyor strands being oriented and positioned so that when the fork is moved down the tines of said fork enter between said spaced strands of said conveyor and descend to a level below said strands so as to allow the bag to rest upon and be supported by said strands of said conveyor said tines extending beyond one end of said conveyor, and a support upon which said fork is supported for vertical movement positioned adjacent and exterior of said end of said conveyor.

9. The apparatus of claim 8 further characterized in that the tines of said fork extend substantilly horizontally from and are supported at one end by said support and extend in the direction of travel of the conveyor.

10. In a bag filling machine, means for introducing material to be bagged into the upper open end of a bag, means comprising a fork composed of generally parallel spaced tines for engaging and supporting the bottom of the bag, each of said tines provided at its upper edge with a flange shaped to conform with the bottom of a filled bag, means mounting said fork for up and down movement, a conveyor for filled bags having a plurality of spaced conveyor strands mounted so as to run substantially parallel in spaced relation from a position below said bag to a remote position, said fork and conveyor strands being oriented and positioned so that when the fork is moved down the tines of said fork enter between said spaced strands of said conveyor and descend to a level below said strands, so as to allow the bag to rest upon and be supported by said strands of said conveyor.

11. The apparatus of claim 10 further characterized in that said tines comprise three in number, and said center tine being positioned at an elevation less than the remaining tines.

12. The apparatus of claim 11 further characterized in that said spaced conveyor strands comprise four in number, and two intermediate strands being disposed below the elevation of the two exterior strands whereby said conveyor strands provide a spatial arrangement for fitting the bottom contour of a filled bag.

13. In a bag filling machine, a hopper having a downwardly extending spout through which material to be bagged is delivered, an auger in said spout and means for rotating said auger for forcing material downwardly through such spout, means for supporting the bottom of a bag in position beneath said spout, said means being movable upwardly and downwardly, a carriage frame shaped to embrace the outside of said spout, said carriage being movable upwardly and downwardly on said spout, bag clamp means movable from clamping to unclamping position mounted on the carriage and movable therewith, means for actuating said clamp means to bag engaging position and a stop means responsive to predetermined downward movement of said means supporting said bag during the filling operation for stopping rotation of said auger.

14. The apparatus of claim 13 further characterized by selector means for fixedly connecting said means for supporting the bottom of a bag on said carriage frame.

15. In a bag filling machine, a hopper having a downwardly extending spout through which material to be bagged is delivered, an auger in said spout and means for rotating said auger for forcing material downwardly through such spout, a carriage frame shaped to embrace the outside of the spout, said carriage frame being movable upwardly and downwardly on the spout, bag clamp means movable from clamping to unclamping position mounted on the carriage and movable therewith, means for actuating said clamp means to bag engaging position and means for supporting the bag bottom as it is filled, said means being movable downwardly as the bag is filled.

16. In a bag filling machine having means for introducing material to be bagged into the upper open end of the bag, means comprising a fork of generally parallel spaced tines for engaging and supporting the bottom of the bag, means mounting said fork for up and down movement, a conveyor for filled bags having a plurality of spaced conveyor strands mounted so as to run substantially parallel in spaced relation from a position below said bag to a remote position, said fork and conveyor strands being oriented and positioned so that when the fork is moved down the tines of said fork enter between said spaced strands of said conveyor and descend to a level below said strands so as to allow the bag to rest upon and be supported by said strands of said conveyor, a support upon which said fork is supported for vertical movement, a vertical reciprocal bag supporting means adjacent said means for introducing material to be bagged into the upper open end of the bag and means for connecting said fork thereto for reciprocal movement therewith.

17. The apparatus of claim 16 further characterized by operator actuable means for selectively attaching or disconnecting said fork from said bag supporting means.

18. In an apparatus for filling bags having a spout means adapted to discharge material into the open mouth of the bag, the diameter of the spout means being relatively less than the diameter of the bag top when said top is expanded, the improvement comprising a pair of oppositely disposed bag engaging members each including a plurality of depending resilient spring fingers having rollers at the inward edge thereof and adapted to engage the edge wall portions of the bag top, and means mounting said oppositely disposed members for movement in a plane transverse to said spout means whereby each plurality of rollers will be moved from a position of disengagement to a position of engagement with said edge wall portions of said bag to secure it to said spout means.

19. In an apparatus for filling bags having a spout adapted to discharge material into the open mouth of the bag, the diameter of said spout being relatively less than the diameter of the bag top when said top is expanded, the improvement comprising a pair of oppositely disposed semi-circular jaws mounted for gripping the external surface of said spout, a plurality of auxiliary gripping elements on each of said semi-circular jaws, said auxiliary elements adapted to engage the edge wall portions of the bag top to secure it between said spout and said portions, said auxiliary gripping elements operable simultaneously with the closing of said semi-circular elements, and said auxiliary elements comprising a plurality of depending resilient fingers having rollers at the inward edge thereof, and said rollers adapted to cooperate with the surface of said spout for gripping the top of a bag therebetween.

20. The apparatus of claim 19 further characterized by support means positioned beneath said bag, said support means adapted to lower said bag as said bag becomes filled with material whereby the top edge walls of said bag will slip from engagement between said rollers and said spout.

21. In a bag filling machine, a hopper having a downwardly extending spout through which material to be bagged is delivered, a carraige frame movable upwardly and downwardly on said spout, bag clamp means movable from clamping to unclamping position mounted on the carriage and movable therewith for holding the open mouth of a bag thereon as the carriage is moved, a supporting means supporting the bottom of the bag, means whereby said supporting means may be moved from an upward to a downward position in cooperation with the movement of said carriage and means whereby the filled bag will be released from gripping between said resilient members and said spout as said supporting means is moved downwardly.

22. In a bag filling machine, a hopper having a downwardly extending spout to which material to be bagged is delivered, a carriage frame moved upwardly and downwardly on the spout, bag clamp means movable from clamping to unclamping position mounted on the carriage and movable therewith for holding the open mouth of a bag thereon as the carriage is moved, and means responsive as the carriage moves downwardly due to the downward pull of the bag suspended therefrom causing said clamping means to release the bag top when the bag has received a predetermined charge.

References Cited in the file of this patent

UNITED STATES PATENTS

| | | |
|---|---|---|
| 469,255 | Kyle | Feb. 23, 1892 |
| 661,679 | Wyckoff | Nov. 13, 1900 |
| 714,875 | Doble | Dec. 2, 1902 |
| 2,073,432 | Von Segebaden et al. | Mar. 9, 1937 |
| 2,156,224 | Neuman et al. | Apr. 25, 1939 |
| 2,282,199 | Neuman | May 5, 1942 |
| 2,311,706 | Sowden | Feb. 23, 1943 |
| 2,350,554 | Hartman et al. | June 6, 1944 |
| 2,376,810 | Richardson | May 22, 1945 |
| 2,524,908 | Hartman et al. | Oct. 10, 1950 |
| 2,532,913 | Higginbottom | Dec. 5, 1950 |
| 2,641,384 | Mateer | June 9, 1953 |